US012588014B2

(12) United States Patent
Robin et al.

(10) Patent No.: US 12,588,014 B2
(45) Date of Patent: Mar. 24, 2026

(54) PERIODIC ADVERTISEMENT SUBFRAME ALLOCATION BASED ON TRANSMIT POWER

(71) Applicant: QUALCOMM Incorporated, San Diego, CA (US)

(72) Inventors: Robin Robin, Noida (IN); Nicolas Graube, Cambridge (GB); Deep Shikha Aggarwal, Gurugram (IN); Sonu Lnu, Faridabad (IN); Randhir Kumar, New Delhi (IN); Rahul Sangwan, Charkhi Dadri (IN)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 18/165,239

(22) Filed: Feb. 6, 2023

(65) Prior Publication Data

US 2024/0267905 A1 Aug. 8, 2024

(51) Int. Cl.
H04W 72/044 (2023.01)
H04W 52/24 (2009.01)

(52) U.S. Cl.
CPC ...... H04W 72/0473 (2013.01); H04W 52/245 (2013.01)

(58) Field of Classification Search
CPC .......................... H04W 72/0473; H04W 52/245
USPC .......................................................... 370/329
See application file for complete search history.

(56) References Cited

U.S. PATENT DOCUMENTS

2020/0106877 A1* 4/2020 Ledvina ................ H04W 4/026
2020/0336991 A1* 10/2020 Bhutani .............. H04W 52/228
2021/0288727 A1 9/2021 Geiger et al.
2025/0159458 A1* 5/2025 Sahin ...................... H04W 4/02

FOREIGN PATENT DOCUMENTS

EP 3634048 B1 8/2022

OTHER PUBLICATIONS

International Search Report and Written Opinion—PCT/US2023/082163—ISA/EPO—Mar. 27, 2024.

* cited by examiner

*Primary Examiner* — Asad M Nawaz
*Assistant Examiner* — Hugh Mark Ashley
(74) *Attorney, Agent, or Firm* — QUALCOMM Incorporated

(57) ABSTRACT

Disclosed are systems, apparatuses, processes, and computer-readable media for wireless communications. For example, a process can include determining, by a network entity, a transmit power value for communicating with a wireless communication device. The network entity can select a subframe of a plurality of subframes, wherein the subframe is selected based on the transmit power value and a respective subframe transmit power value associated with the subframe, and wherein the respective subframe transmit power value is greater than or equal to the transmit power value. The process can further include allocating the wireless communication device to the subframe and transmitting a periodic advertisement (PA) to a plurality of wireless communication devices using the subframe and the respective subframe transmit power value, wherein the plurality of wireless communication devices includes the wireless communication device.

30 Claims, 7 Drawing Sheets

100

600

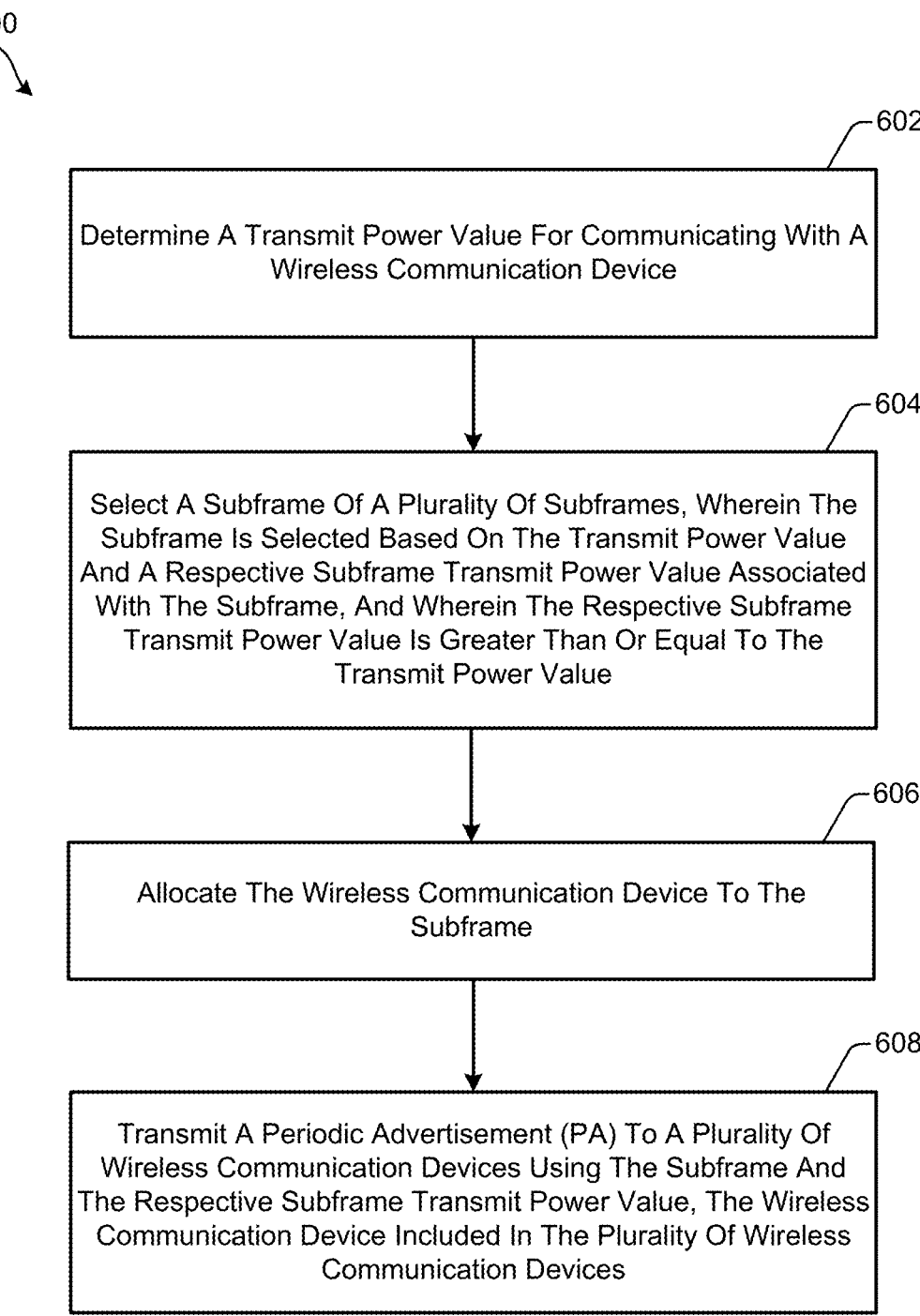

602

Determine A Transmit Power Value For Communicating With A Wireless Communication Device

604

Select A Subframe Of A Plurality Of Subframes, Wherein The Subframe Is Selected Based On The Transmit Power Value And A Respective Subframe Transmit Power Value Associated With The Subframe, And Wherein The Respective Subframe Transmit Power Value Is Greater Than Or Equal To The Transmit Power Value

606

Allocate The Wireless Communication Device To The Subframe

608

Transmit A Periodic Advertisement (PA) To A Plurality Of Wireless Communication Devices Using The Subframe And The Respective Subframe Transmit Power Value, The Wireless Communication Device Included In The Plurality Of Wireless Communication Devices

FIG. 6

PERIODIC ADVERTISEMENT SUBFRAME ALLOCATION BASED ON TRANSMIT POWER

FIELD OF THE DISCLOSURE

The present disclosure generally relates to wireless communications. For example, aspects of the present disclosure relate to subframe allocation in a synchronization system including one or more network devices (e.g., access points (APs)) and one or more wireless communication devices (e.g., peripheral devices, such as electronic shelf labels (ESLs)).

BACKGROUND OF THE DISCLOSURE

Short range wireless communication enables wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz.

BLUETOOTH® Low Energy (BLE) is a form of BLUETOOTH® communication that allows for communication with devices running on low power. Such devices may include beacons, which are wireless communication devices that may use low-energy communication technology for positioning, proximity marketing, or other purposes. In some cases, such devices may serve as nodes (e.g., relay nodes) of a wireless mesh network that communicates and/or relays information to a managing platform or hub associated with the wireless mesh network.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method of wireless communications performed at a network entity is provided, the method comprising: determining a transmit power value for communicating with a wireless communication device; selecting a subframe of a plurality of subframes, wherein the subframe is selected based on the transmit power value and a respective subframe transmit power value associated with the subframe, and wherein the respective subframe transmit power value is greater than or equal to the transmit power value; allocating the wireless communication device to the subframe; and transmitting a periodic advertisement (PA) to a plurality of wireless communication devices using the subframe and the respective subframe transmit power value, wherein the plurality of wireless communication devices includes the wireless communication device.

In another example, a network entity for wireless communications is provided. The network entity for wireless communications includes at least one memory and at least one processor coupled to the at least one memory and configured to: determine a transmit power value for communicating with a wireless communication device; select a subframe of a plurality of subframes, wherein the subframe is selected based on the transmit power value and a respective subframe transmit power value associated with the subframe, and wherein the respective subframe transmit power value is greater than or equal to the transmit power value; allocate the wireless communication device to the subframe; and transmit a periodic advertisement (PA) to a plurality of wireless communication devices using the subframe and the respective subframe transmit power value, wherein the plurality of wireless communication devices includes the wireless communication device.

In another example, a non-transitory computer-readable medium is provided that includes instructions that, when executed by at least one processor, cause the at least one processor to: determine a transmit power value for communicating with a wireless communication device; select a subframe of a plurality of subframes, wherein the subframe is selected based on the transmit power value and a respective subframe transmit power value associated with the subframe, and wherein the respective subframe transmit power value is greater than or equal to the transmit power value; allocate the wireless communication device to the subframe; and transmit a periodic advertisement (PA) to a plurality of wireless communication devices using the subframe and the respective subframe transmit power value, wherein the plurality of wireless communication devices includes the wireless communication device.

In another example, an apparatus for wireless communications at a wireless communication device is provided. The apparatus includes: means for determining a transmit power value for communicating with a wireless communication device; means for selecting a subframe of a plurality of subframes, wherein the subframe is selected based on the transmit power value and a respective subframe transmit power value associated with the subframe, and wherein the respective subframe transmit power value is greater than or equal to the transmit power value; means for allocating the wireless communication device to the subframe; and means for transmitting a periodic advertisement (PA) to a plurality of wireless communication devices using the subframe and the respective subframe transmit power value, wherein the plurality of wireless communication devices includes the wireless communication device.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a flow chart illustrating an example of a process for wireless communications at a network device, in accordance with some examples.

DETAILED DESCRIPTION

Figure 1:
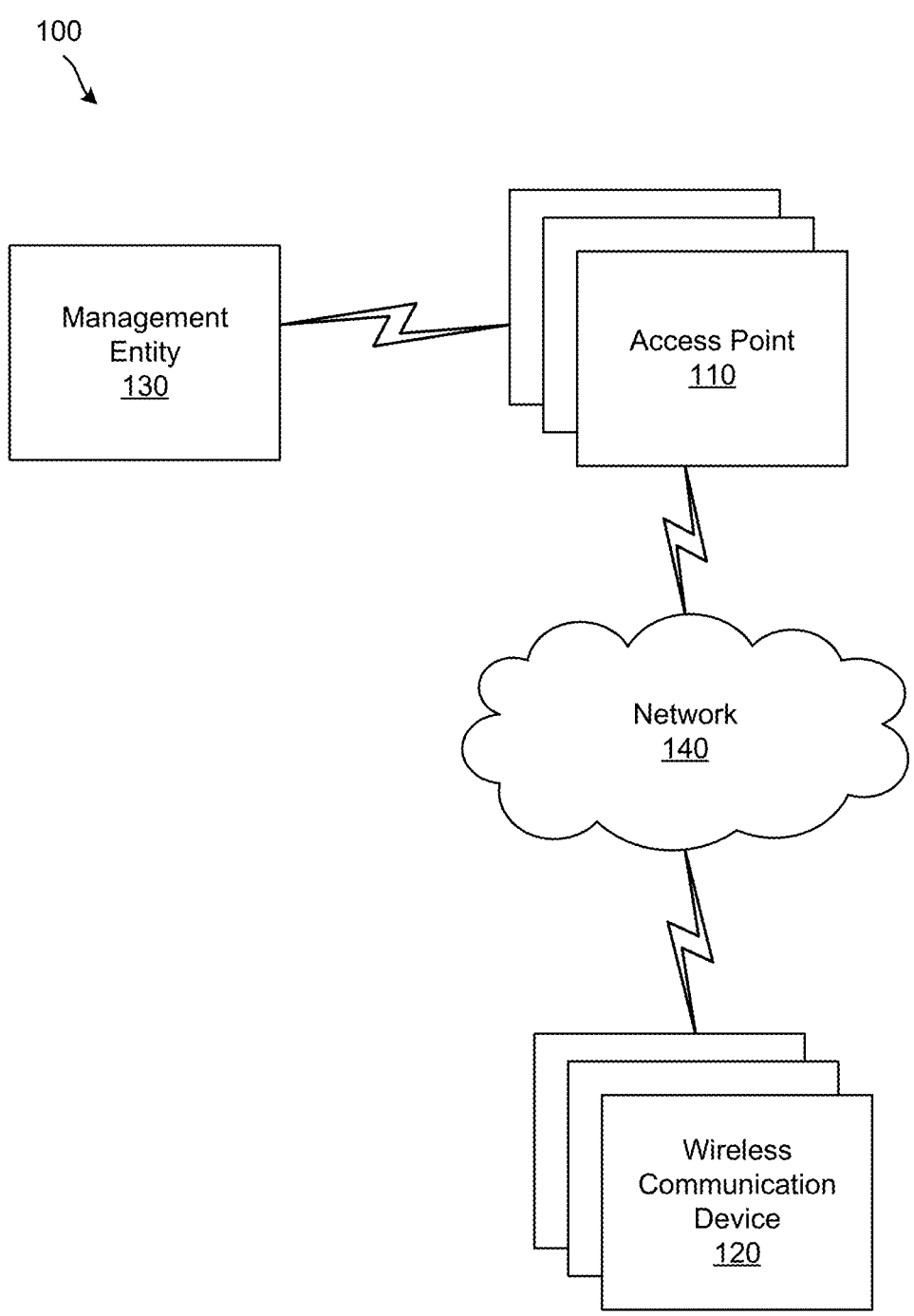
FIG. 1 is a diagram illustrating an example environment in which systems and/or methods described herein may be implemented, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

A system may include one or more wireless communication devices that are controlled by a network entity. For example, an electronic shelf label (ESL) system may include one or more wireless communication devices (e.g., ESLs) that are controlled by a network entity, such as a management entity (ME), via at least one network device, such as an access point (AP). In one or more examples, to facilitate control by the management entity, each ESL may have a wireless connection (e.g., a BLUETOOTH® Low Energy (BLE) connection or other connection) to an access point (AP) that is communicatively connected to the management entity (e.g., via the Internet, such as wirelessly, via an Ethernet connection, etc.). In some cases, commands from the management entity may be wirelessly transmitted to the ESLs by the access point. Responses or information from the ESLs may also be received by the access point and provided by the access point to the management entity. While examples are described herein using ESLs as illustrative examples of wireless communication devices, a management entity as an example of a network entity, and access points as examples of network devices, the systems and techniques described herein are applicable to any type of system or network.

In ESL systems, periodic Advertisements (PAs) are often utilized to provide regular and predictable payload transmissions from a central device (e.g., which may simply be referred to as a "central" and may be in the form of a network device, such as an access point) to one or more peripheral devices (e.g., which may each simply be referred to as a "peripheral" and may each be in the form of a wireless communication device, such as an ESL). For example, PAs can be used to issue information from a central device to multiple peripheral devices, which may be within one or more groups of peripheral devices. PAs are generally unidirectional (e.g., unidirectional transmissions) such that PAs are transmitted only one-way from a central device to one or more peripheral devices. Unfortunately, the unidirectionality of PAs prevents PAs to be able to operate as a basis of a true network.

Periodic Advertisement with Response (PAwR) can be used for ESL systems to provide bidirectionality (e.g., bidirectional transmissions between a central device and one or more peripheral devices). Peripheral devices synchronized within a particular group of peripheral devices can be addressed by a central device on a synchronized channel (e.g., a radio frequency (RF) channel between the central device and the peripheral devices) whenever the central device chooses to send (e.g., transmit) a request to the peripheral devices. In some cases, as used herein, a synchronized channel refers to a channel on which transmissions are synchronized (in time). For example, the channel includes a frequency on which one or more communications are transmitted. A hopping frequency sequence defines the channel, where the sequence progresses at a fixed determine interval. A central device and one or more peripheral devices can concurrently track the sequence at the predefined frequency hopping pattern (e.g., so the central device knows when to transmit the request and the peripheral devices know when to listen for and/or receive the request).

A request transmitted by a central device to peripheral devices in a particular group may be a PA containing a synchronization message transmitted by the central device on the synchronized channel to the peripheral devices of the particular group. For example, wireless communication devices within the particular group can wake up (e.g., from a low power (LP) mode) at the same PA transmission with respect to a particular PAwR train for that group. A PA is made up of a periodic set of transmissions, where the collection of transmissions is collectively referred to as a PA train or a PAwR train when applied to PAwR. Each transmission of a PA train (or PAwR train) occurs at a precise point in time, with fixed intervals between the transmissions. A communication channel (e.g., one communication channel out of thirty-seven available communication channels) is selected for each of the transmissions, where the communication channel follows a hopping frequency sequence. The synchronization between the central device and the peripheral devices in the group is based on the periodicity of the PA. The periodically-transmitted messages (e.g., the synchronization messages) include zero, one, or more commands (e.g., a respective operational code (OpCode) and parameters associated with each command). If a response from a particular peripheral device is expected by the central device (e.g., the synchronization message from the central device requests a response from a specific peripheral device), the peripheral device will respond in a specific response slot, based on where the peripheral device appeared within a sequence contained within the synchronization message transmitted by the central device.

As noted above, PAwR can be used to synchronize peripheral devices with a central device. Based on the synchronizing, the peripheral devices can respond to periodic transmissions (e.g., PAs) transmitted by the PAwR central (e.g., the central device). For example, a first set of time slots can be used to transmit the PAs from the central device (or the first set of time slots may be reserved for PA transmission from the central device). A second set of time slots can include time slots that are non-overlapping with (e.g., between) the first set of time slots associated with the PA transmission(s) from the central device. The second set of time slots can be used by the peripheral devices to transmit various responses to messages transmitted by the central device (e.g., responses to the PA transmission(s) from the central device).

Subframe allocation can be performed to join or subscribe a peripheral device to a central device. For example, subframe allocation can be performed during an onboarding procedure between the peripheral device and the central device, in response to a subscription request from the peripheral device to the central device, etc. Subframe allocation can be used to assign the peripheral device to a particular group of devices that communicate with the central device using the same subframe. For instance, a time frame associated with the central device may have a periodicity (e.g., duration) of 1.6 seconds and can be divided into a plurality of subframes (e.g., such as 128 subframes each having a periodicity of 12.5 milliseconds (ms)). A first group of devices can be allocated to a first subframe and may each communicate with the central device (e.g., transmit and/or receive messages) during the first subframe; a second group of devices can be allocated to a second subframe and may each communicate with the central device during the second subframe; etc. In addition to allocating a subframe, the central device may allocate a device ID to each peripheral device. Continuing in the example above, the central device may allocate a peripheral device to one of 128 different groups (e.g., corresponding to the 128 subframes), and may allocate the peripheral device to one of 256 device IDs associated with each group.

The central device may perform subframe and device ID allocation based on an allocation sequence basis. The allocation sequence basis may be a fixed or pre-determined allocation sequence. For example, as new peripheral devices are onboarded to the central device, the plurality of different groups (e.g., subframes) and device IDs (e.g., slots within a respective subframe) can be allocated sequentially to the peripheral devices, based on the allocation sequence basis. Sequential subframe and device ID allocation can result in peripheral devices being allocated into subframe groups based on the relative timing of each peripheral device's onboarding or subscription to the central (e.g., the first 256 peripheral devices may be allocated the 256 device IDs of subframe group 1, the next 256 peripheral devices may be allocated the 256 device IDs of subframe group 2, etc.).

The various peripheral devices for which subframe and device ID allocation is performed may be associated with different distances and communication paths to the central device. For example, some of the peripheral devices may be located relatively close to the central device and may be able to communicate (e.g., transmit and receive on the PAwR train of the central device) with a relatively low transmit power (e.g., a relatively low configured transmit power and a relatively low measured transmitted power). Other ones of the peripheral devices may be located relatively far from the central device and may require a relatively higher transmit power to communicate on the PAwR train of the central device. Additionally, one or more peripheral devices may not have a clear line-of-sight communication path to the central device and may also require a relatively higher transmit power to communicate on the PAwR train of the central device.

Sequential subframe allocation performed by the central device to onboard new peripheral devices can result in some (or all) of the allocated subframe groups including peripheral devices with relatively low Tx power requirements and peripheral devices with relatively high Tx power requirements. The terms "Tx power" and/or "Tx power requirements", as used herein with respect to a central device, may refer to an amount of power that is utilized (or expected to be utilized) by the central device to transmit information. For example, the Tx power of a central device can refer to the amount of power that the central applies to transmit information using a radio or other transmitter of the central device. When used with respect to a peripheral device, the terms "Tx power" and/or "Tx power requirements" may refer to an expected power utilized by a central device for a transmission from the central device to the peripheral device (e.g., the amount of power utilized by a central device for a transmission received by the peripheral device from the central device). However, the central device may use a constant Tx power across all of the subframe groups. For instance, the constant Tx power can be selected to be greater than or equal to the highest Tx power requirement associated with one of the plurality of peripheral devices subscribed to the central device. However, such an approach can be inefficient, as the central device uses a greater Tx power than is needed for all of the peripheral devices having a Tx power requirement that is lower than the maximum Tx power requirement within the group of peripheral devices. For instance, a constant Tx power that is greater than or equal to the maximum peripheral device Tx power requirement may be optimal for the peripheral devices having the maximum Tx power requirement, but is greater than optimal for any remaining peripheral devices having a lower Tx power requirement. In some cases, power management (e.g., such as the Tx power management described herein) can be seen to reduce or minimize RF interference between various ones of the peripheral devices and the central device (e.g., based on greater RF interference potentially occurring for higher Tx power levels). Additionally, each peripheral device may use the same Tx power to communicate with the central device (e.g., to transmit a response to a PA from the central device). There is a need for systems and techniques that can be used to provide subframe allocation between a central device and a plurality of peripheral devices based on one or more transmit power determinations. For example, there is a need to provide subframe allocation based on a minimum transmit power associated with reliable communications between the central device and each respective peripheral device.

Systems, apparatuses, processes (also referred to as methods), and computer-readable media (collectively referred to as "systems and techniques") are described herein that can be used to perform subframe allocation based on one or more transmit power determinations associated with a central device and one or more peripheral devices. For example, the central device can profile each respective peripheral device of the one or more peripheral devices during an onboarding process and can determine a respective transmit power associated with the respective peripheral device. In some examples, the central device can initiate profiling of each respective peripheral device of the one or more peripheral devices after an onboarding process has already been performed (e.g., using one or more opcodes), and can determine the respective transmit power associated with the respective peripheral device. For instance, the respective transmit power can be a minimum transmit power required to establish reliable communications between the central device and the respective peripheral device (e.g., a minimum transmit power of the central device that can be reliably received by the respective peripheral device).

In some aspects, the systems and techniques can be used to perform subframe allocation based on transmit power determinations associated with one-to-many and/or many-to-one communications. For example, subframe allocation can be performed based on transmit power determinations associated with one-to-many transmissions from the central device to a set of peripheral devices associated with a respective subframe group. In one illustrative example, the transmit power determination for each peripheral device can be indicative of a minimum transmit power for communications initiated by the central device (e.g., PAs transmitted by the central device and/or messages transmitted by the central device on a PAwR train of the central device). Subframe allocation can be performed such that peripheral devices are allocated to a subframe group of peripheral devices having a same or similar minimum transmit power requirement.

For instance, peripheral devices determined to have a relatively low minimum transmit power requirement can be allocated to a first subframe group and peripheral devices determined to have a relatively high minimum transmit power requirement can be allocated to a second subframe group. During a subframe associated with the first subframe group, the central device can transmit one or more PAs or other messages using a relatively low transmit power. During a subframe associated with the second subframe group, the central device can increase its transmit power and transmit one or more PAs or other messages using a relatively high transmit power. Based on the subframe allocation using the one or more transmit power determinations, the central device can adjust its transmit power for different subframes (e.g., different subframe groups of peripheral devices) to better match the minimum transmit power requirements of the peripheral devices allocated to each subframe. In some aspects, the central device can additionally, or alternatively, adjust the assignment of peripheral devices to subframes. For instance, the central device can determine Received Signal Strength Indication (RSSI) information associated with each respective peripheral device. Based on a change in the measured RSSI for a given peripheral device, the central device can dynamically re-assign the given peripheral device to a different subframe and subframe group.

In some aspects, a transmit power handshake can be performed between a central device and a peripheral device during onboarding (e.g., onboarding or subscription of the peripheral device to the central device). For example, the transmit power handshake can be used by the central device to determine one or more transmit power levels for transmitting a signal (e.g., message) to the peripheral device. In some examples, the transmit power handshake can additionally be used by the peripheral device to determine one or more transmit power levels for transmitting a signal (e.g., message) to the central device. In some aspects, a peripheral device can calibrate or adjust its transmit power based on receiving feedback from the central device. For example, the peripheral device can receive feedback from the central device indicative of a Received Signal Strength Indication (RSSI) determined by the central device for a signal transmitted by the peripheral device using a respective transmit power.

In some examples, the central device can periodically receive RSSI information from some (or all) of the peripheral devices associated with the central device. For example, the central device can reserve one or more transmission slots during which some (or all) of the peripheral devices can provide the central device with RSSI information determined based on each respective peripheral device receiving a signal or message transmitted by the central device. In some examples, the central device can reserve one or more transmission slots within each respective subframe, wherein the peripheral devices included in the subframe group associated with the respective subframe can measure and/or transmit the RSSI information using the reserved transmission slots within the respective subframe. Based on receiving the RSSI information from the peripheral devices, the central device can perform a global calibration of its transmit power. For instance, the central device can determine a minimum transmit power that is needed for all of the peripheral devices to successfully receive signals (e.g., messages) transmitted by the central device.

Additional aspects of the present disclosure are described with reference to the figures.

FIG. 1 is a diagram of an example environment 100 in which systems and/or methods described herein may be implemented. As shown in FIG. 1, the environment 100 may include at least one access point (AP) 110, at least one wireless communication device 120, a management entity (ME) 130, and a network 140. Devices of the environment 100 may interconnect via wired connections, wireless connections, or a combination of wired and wireless connections.

The access point 110 may include one or more devices capable receiving, generating, storing, processing, providing, and/or routing information associated with access point synchronization and/or handover, as described elsewhere herein. The access point 110 may include a communication device and/or a computing device. The access point 110 may be configured to transmit beacons (e.g., BLE beacons), as well as to scan and locate other devices (e.g., other devices communicating using BLE protocols).

The wireless communication device 120 may include one or more devices capable of receiving, generating, storing, processing, and/or providing information associated with access point synchronization and/or handover, as described elsewhere herein. The wireless communication device 120 may include a communication device and/or a computing device. In some aspects, the wireless communication device 120 may be, may include, or may be included in an electronic shelf label (ESL).

The management entity 130 includes one or more devices capable of receiving, generating, storing, processing, providing, and/or routing information associated with access point synchronization and/or handover, as described elsewhere herein. The management entity 130 may include a communication device and/or a computing device. For example, the management entity 130 may include a server, such as an application server, a client server, a web server, a database server, a host server, a proxy server, a virtual server (e.g., executing on computing hardware), or a server in a cloud computing system. In some aspects, the management entity 130 includes computing hardware used in a cloud computing environment. The management entity 130 may provide control of a system (e.g., an ESL system) that includes the access point(s) 110, the wireless communication device(s) 120, and/or the device(s) 130. The access point(s) 110 may be communicatively connected to the management entity 130 via a network (not shown), such as the Internet.

The network 140 may include one or more wireless networks. For example, the network 140 may include a personal area network (e.g., a Bluetooth network). The network 140 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
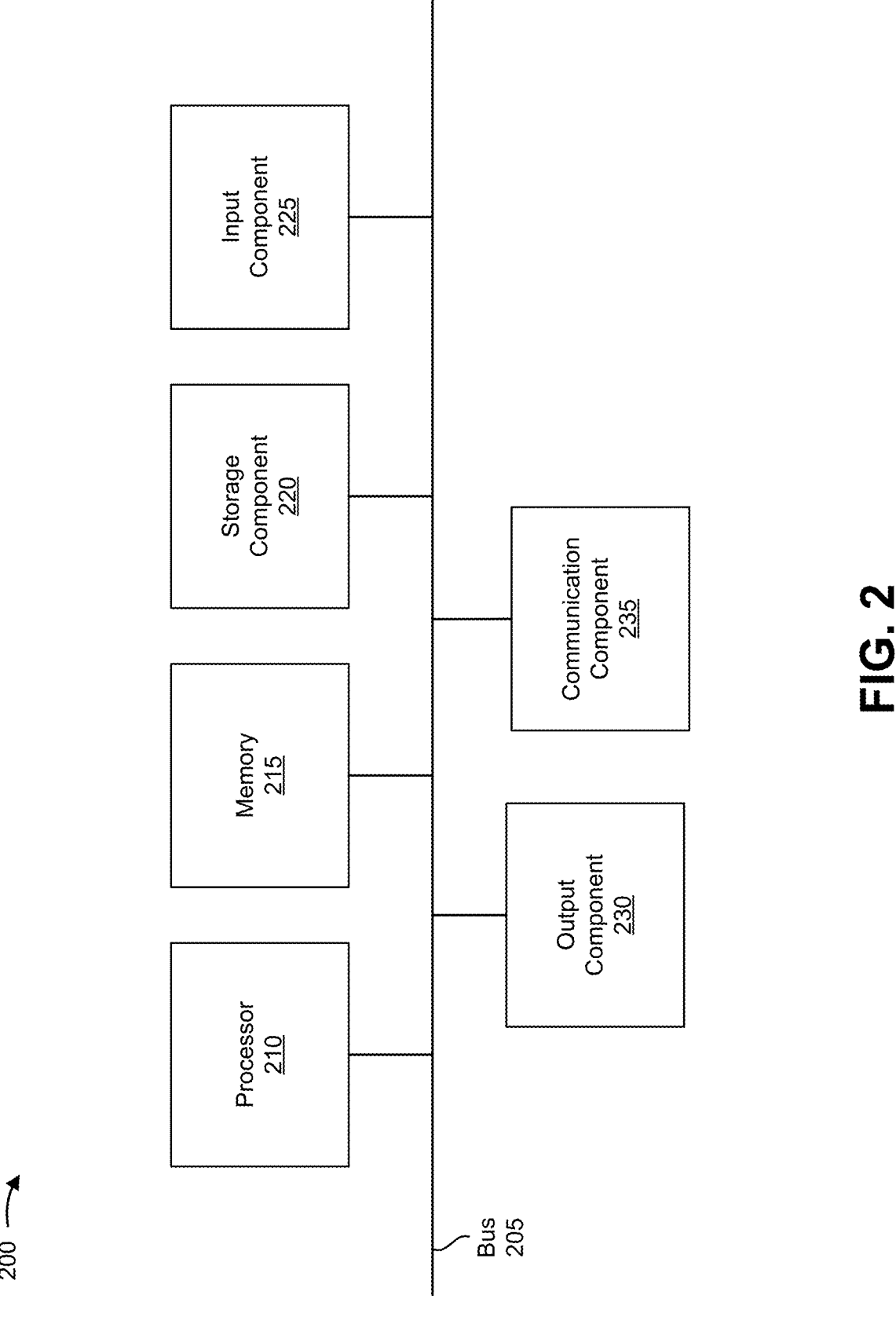
FIG. 2 is a diagram illustrating example components of a device, in accordance with some examples.

FIG. 2 is a diagram illustrating example components of a device 200, in accordance with the present disclosure. Device 200 may correspond to access point 110, wireless communication device 120, and/or management entity 130.

In some aspects, access point 110, wireless communication device 120, and/or management entity 130 may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
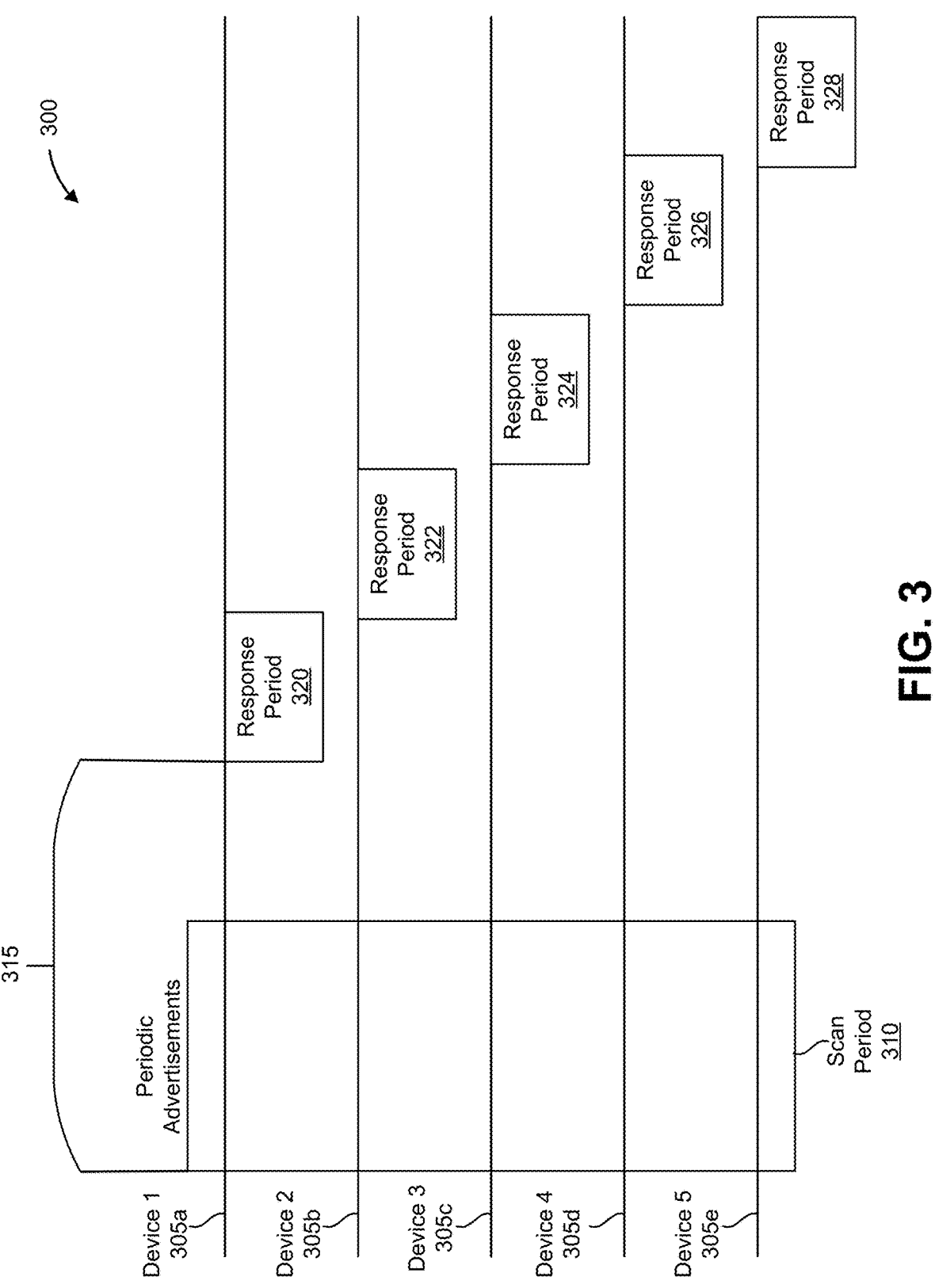
FIG. 3 is a signaling diagram illustrating example communication transmissions, in accordance with some examples.
Figure 4:
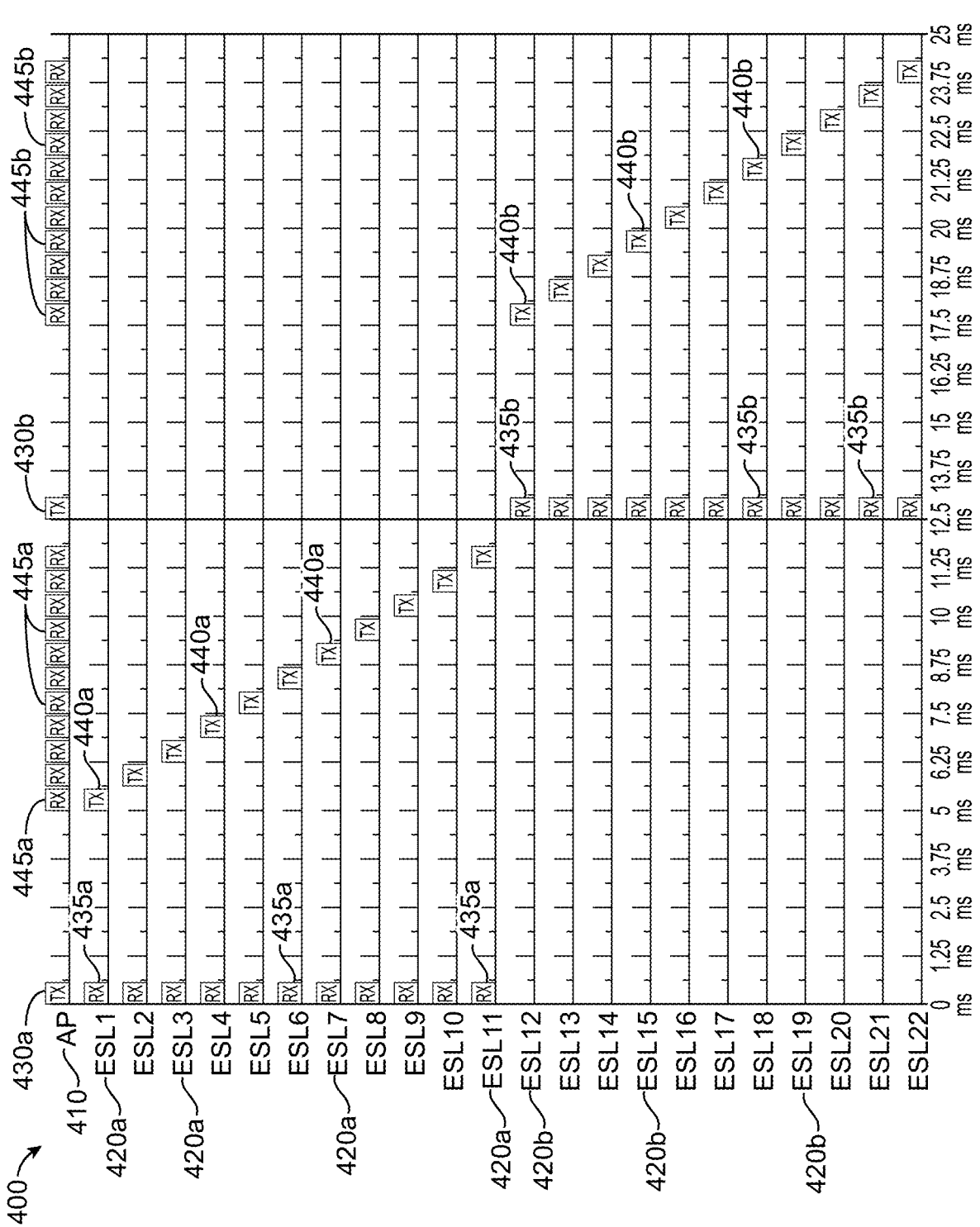
FIG. 4 is a signaling diagram illustrating an example of communication transmissions between a network device and two groups of wireless communication devices, in accordance with some examples.

FIGS. 3 and 4 show signaling diagrams illustrating examples of PAwR in an ESL system. For example, the signaling diagram of FIG. 3 illustrates an example PAwR for a group of wireless network devices (e.g., device 1 305a, device 2 305b, device 3 305c, device 4 305d, and device 5 305e), and the signaling diagram of FIG. 4 illustrates an example PAwR for two groups of wireless network devices 420a, 420b (e.g., a first group including ESL1 to ESL 11, and a second group including ESL 12 to ESL 22). Specifically, FIG. 3 is a signal timing diagram illustrating a portion of a communication between an access point (e.g., access point 110) and wireless communication devices 120 (e.g., ESLs). With reference to FIG. 1, the signal sequence illustrated in FIG. 3 may be implemented by one or more of the communication connections, access points 110, and/or wireless communication devices 120 of FIG. 1.

The devices (e.g., device 1 305a, device 2 305b, device 3 305c, device 4 305d, and device 5 305e) of FIG. 3 may be selected from wireless communication devices 120 of FIG. 1 and may each receive a periodic advertisement (PA) in a scan period 310. The scan period 310 may occur in regularly scheduled intervals and may be repeated periodically such that the devices (e.g., device 1 305a, device 2 305b, device 3 305c, device 4 305d, and device 5 305e) can awaken to scan for messages during this repeated scan period 310. An access point (e.g., access point 110 of FIG. 1) may provide periodic advertisements (PAs) via broadcast or multi-cast to the devices (e.g., device 1 305a, device 2 305b, device 3 305c, device 4 305d, and device 5 305e) in the scan period 310. For an access point (e.g., access point 110 of FIG. 1), the scan period 310 can be its primary transmission period. In some cases, the scan period 310 may not be a fixed time because the access point (e.g., access point 110 of FIG. 1) may send different lengths of data from the start of the scan period 310.

The transmission may include multiple advertisements in a train. One or more portions of the advertisements may be directed to one or more of the devices (e.g., device 1 305a, device 2 305b, device 3 305c, device 4 305d, and device 5 305e). The devices (e.g., device 1 305a, device 2 305b, device 3 305c, device 4 305d, and device 5 305e) may decode or filter the messages intended for each specific device and transmitted during the period when all devices are receiving. In this way, the devices (e.g., device 1 305a, device 2 305b, device 3 305c, device 4 305d, and device 5 305e) may be reprogrammed, updated, and/or sent requests from an access point (e.g., access point 110 of FIG. 1) or relayed from another device (e.g., management entity 130 of FIG. 1) through the access point (e.g., access point 110 of FIG. 1). The periodic advertisement (PA) from the access point (e.g., access point 110 of FIG. 1) may set a response period for one or more of the devices (e.g., device 1 305a, device 2 305b, device 3 305c, device 4 305d, and device 5 305e).

As illustrated, the devices (e.g., device 1 305a, device 2 305b, device 3 305c, device 4 305d, and device 5 305e) are each assigned a response period 320, 322, 324, 326, 328 in the time after the scan period 310. In some cases, the assignment of the response period to a particular device may not be permanent. In some aspects, the assignment may be inferred from a payload of a synchronization message. The first response period 320 may begin following an idle time 315 after the scan period 310, with the idle period being long enough to provide the transmitter device an opportunity to do other Bluetooth related activities. The assigned response periods may also be limited to or designate a particular frequency of the channels on which to respond. For example, in FIG. 3, device 1 305a is assigned response period 320, device 2 305b is assigned response period 322, device 3 305c is assigned response period 324, device 4 305d is assigned response period 326, and device 5 305e is assigned response period 328. The access point (e.g., access point 110 of FIG. 1) may store attributes of the devices (e.g., device 1 305a, device 2 305b, device 3 305c, device 4 305d, and device 5 305*e*), including whether a device is able to transmit or respond. The PA signaling followed by responses can be referred to as periodic advertisement with multiple responses (PAwMR).

For example, device 3 305*c* (e.g., wireless communication device 120 of FIG. 1) may be an ESL and may receive a price update in a PA from the access point (e.g., access point 110 of FIG. 1) in scan period 310. The PA received at device 3 305*c* may include a designated start time for the response period 324 or may include a schedule of response start times for devices including device 3 305*c*. The response by device 3 305*c* to the access point (e.g., access point 110 of FIG. 1) may include an acknowledgement, a status code, and/or other information such as battery life, received signal strength, and/or an error notification. The response by device 3 305*c* may include information to be relayed to another device by the access point (e.g., access point 110 of FIG. 1). The response may include a packet with a header and may conform to any of the Bluetooth protocols. A response may be transmitted in a data channel of the Bluetooth protocol to the access point (e.g., access point 110 of FIG. 1). Both the PA and the responses from all of the devices (e.g., device 1 305*a*, device 2 305*b*, device 3 305*c*, device 4 305*d*, and device 5 305*e*) may use channels of the Bluetooth protocol.

A device (e.g., device 5 305*e*) that has been assigned a response period may not respond and may determine that it has nothing to signal. For example, the devices (e.g., device 1 305*a*, device 2 305*b*, device 3 305*c*, device 4 305*d*, and device 5 305*e*) may determine what response, if any, is required and may or may not respond to a request sent from the access point (e.g., access point 110 of FIG. 1). The response periods 320, 322, 324, 326, 328 may be assigned based on a request for such a period in an open transmission time, the request being sent to the access point (e.g., access point 110 of FIG. 1). The response periods 320, 322, 324, 326, 328 may be assigned based on which devices have been requested by the access point (e.g., access point 110 of FIG. 1) to send data or acknowledgements. The PA messages and responses may be frequency-hopped, time synchronized channels, and/or extended channels of the advertising channels in Bluetooth.

As previously mentioned, FIG. 4 shows an example PAwR for two groups of wireless network devices 420*a*, 420*b* (e.g., a first group including ESL1 to ESL 11, and a second group including ESL 12 to ESL 22). In particular, FIG. 4 is a signaling diagram illustrating an example of communication transmissions 400 between a network device 410 (e.g., a central device, which may be an access point) and two groups of wireless communication devices 420*a*, 420*b* (e.g., peripheral devices, which may be ESLs). With reference to FIG. 1, the signal sequence illustrated in FIG. 4 may be implemented by one or more of the communication connections, access points 110, and/or wireless communication devices 120 of FIG. 1.

In FIG. 4, the signaling diagram is shown in the form of a graph with an x-axis denoting time in milliseconds (ms) and a y-axis denoting specific wireless communication devices 420*a*, 420*b* (e.g., ESL1, ESL 2, ESL 3, ESL 4, ESL 5, ESL 6, ESL 7, ESL 8, ESL 9, ESL 10, ESL 11, ESL 12, ESL 13, ESL 14, ESL 15, ESL 16, ESL 17, ESL 18, ESL 19, ESL 20, ESL 21, and ESL 22). In particular, the x-axis of the graph of FIG. 4 denotes time starting from 0 ms and ending at 25 ms. The time can be divided into two subframes, which are each a length of 12.5 ms. As such, the two subframes may include a first subframe from 0 ms to 12.5 ms, and a second subframe from 12.5 ms to 25 ms. In one or more examples, there may be more or less than two subframes as is shown in FIG. 4, and/or each subframe may be longer or shorter than 12.5 ms as shown in FIG. 4.

In one or more examples, the wireless communication devices 420*a*, 420*b* (e.g., peripheral devices) may be assigned (e.g., by the network device 410 and/or by a network entity, such as a management entity) to different groups (e.g., two groups) of wireless communication devices 420*a*, 420*b*. For example, wireless communication devices 420*a* (e.g., ESL1, ESL 2, ESL 3, ESL 4, ESL 5, ESL 6, ESL 7, ESL 8, ESL 9, ESL 10, and ESL 11) may be assigned to a first group (e.g., group 1), and wireless communication devices 420*b* (e.g., ESL 12, ESL 13, ESL 14, ESL 15, ESL 16, ESL 17, ESL 18, ESL 19, ESL 20, ESL 21, and ESL 22) may be assigned to second group (e.g., group 2).

In FIG. 4, during operation for PAwR, at time 0 ms for the first subframe of time, the network device 410 (e.g., a central, such as an AP) may transmit 430*a* to a first group (e.g., group 1) of wireless communication devices 420*a* (e.g., ESL 1, ESL 2, ESL 3, ESL 4, ESL 5, ESL 6, ESL 7, ESL 8, ESL 9, ESL 10, and ESL 11) a PA containing a synchronization message (e.g., an AP synchronization message) over a synchronized channel between the network device 410 and the wireless communication devices 420*a*, 420*b*. As noted previously, a synchronization message can include one or more commands. For instance, a command can include an operational code (OpCode) and parameters associated with the command. At time 0 ms, the first group of wireless communication devices 420*a* (e.g., ESL 1, ESL 2, ESL 3, ESL 4, ESL 5, ESL 6, ESL 7, ESL 8, ESL 9, ESL 10, and ESL 11) can receive 435*a* the PA containing the synchronization message over the synchronized channel.

In one or more examples, the network device 410 may be configured to transmit PAs at a specified time interval (e.g., a subframe of time), such as at every 12.5 ms as is shown in FIG. 4. In one or more examples, the specified time interval (e.g., a subframe) may be shorter or longer than the 12.5 ms as is shown in FIG. 4. The wireless communication devices 420*a*, 420*b* may respond to a PA by using their specific respective response slot in time.

In one or more examples, the synchronization message transmitted 430*a* to the first group (e.g., group 1) of wireless communication devices 420*a* (e.g., ESL 1, ESL 2, ESL 3, ESL 4, ESL 5, ESL 6, ESL 7, ESL 8, ESL 9, ESL 10, and ESL 11) may indicate a respective response slot for one or more of the wireless communication devices 420*a* (e.g., ESL 1, ESL 2, ESL 3, ESL 4, ESL 5, ESL 6, ESL 7, ESL 8, ESL 9, ESL 10, and/or ESL 11) in the first group to use to transmit 440*a* a response to the network device 410. If a wireless communication device 420*a* (e.g., ESL 1, ESL 2, ESL 3, ESL 4, ESL 5, ESL 6, ESL 7, ESL 8, ESL 9, ESL 10, and ESL 11) is addressed within the synchronization message, the wireless communication device 420*a* (e.g., ESL 1, ESL 2, ESL 3, ESL 4, ESL 5, ESL 6, ESL 7, ESL 8, ESL 9, ESL 10, and ESL 11) can respond (e.g., transmit 440*a*) in its respective response slot, as indicated within the synchronization message.

For example, the synchronization message may indicate a specific sequence for one or more of the wireless communication devices 420*a* (e.g., ESL 1, ESL 2, ESL 3, ESL 4, ESL 5, ESL 6, ESL 7, ESL 8, ESL 9, ESL 10, and/or ESL 11) to respond (e.g., transmit 440*a*) in time (e.g., responding after 5 ms has elapsed after the start of the subframe at response slots located every 0.625 ms). For example, the sequence may indicate that wireless communication device 420*a* (e.g., ESL 1) should respond in a response slot located at 5 ms, wireless communication device 420*a* (e.g., ESL 2)

should respond in a response slot located at 5.625 ms, wireless communication device 420a (e.g., ESL 3) should respond in a response slot located at 6.25 ms, wireless communication device 420a (e.g., ESL 4) should respond in a response slot located at 6.875 ms, wireless communication device 420a (e.g., ESL 5) should respond in a response slot located at 7.5 ms, wireless communication device 420a (e.g., ESL 6) should respond in a response slot located at 8.125 ms, wireless communication device 420a (e.g., ESL 7) should respond in a response slot located at 8.75 ms, wireless communication device 420a (e.g., ESL 8) should respond in a response slot located at 9.375 ms, wireless communication device 420a (e.g., ESL 9) should respond in a response slot located at 10 ms, wireless communication device 420a (e.g., ESL 10) should respond in a response slot located at 10.625 ms, and wireless communication device 420a (e.g., ESL 11) should respond in a response slot located at 11.25 ms.

After the wireless communication devices 420a (e.g., ESL 1, ESL 2, ESL 3, ESL 4, ESL 5, ESL 6, ESL 7, ESL 8, ESL 9, ESL 10, and ESL 11) have received 435a the PA containing the synchronization message from the network device 410, according to the sequence specified within the synchronization message, the one or more wireless communication devices 420a (e.g., ESL 1, ESL 2, ESL 3, ESL 4, ESL 5, ESL 6, ESL 7, ESL 8, ESL 9, ESL 10, and/or ESL 11) can transmit 440a their responses within their respective response slots. After the one or more wireless communication devices 420a (e.g., ESL 1, ESL 2, ESL 3, ESL 4, ESL 5, ESL 6, ESL 7, ESL 8, ESL 9, ESL 10, and/or ESL 11) have transmitted 440a their responses in their respective time slots, the network device 410 can receive 445a their transmitted responses at those specific response slot times.

Then, during operation for PAwR, at time 12.5 ms for the second subframe of time, the network device 410 may transmit 430b to a second group (e.g., group 2) of wireless communication devices 420b (e.g., ESL 12, ESL 13, ESL 14, ESL 15, ESL 16, ESL 17, ESL 18, ESL 19, ESL 20, ESL 21, and ESL 22) a PA containing a synchronization message over a synchronized channel between the network device 410 and the wireless communication devices 420a, 420b. In addition, at time 12.5 ms, the second group of wireless communication devices 420b (e.g., ESL 12, ESL 13, ESL 14, ESL 15, ESL 16, ESL 17, ESL 18, ESL 19, ESL 20, ESL 21, and ESL 22) can receive 435b the PA containing the synchronization message over the synchronized channel.

The synchronization message transmitted 430b to the second group (e.g., group 2) of wireless communication devices 420b (e.g., ESL 12, ESL 13, ESL 14, ESL 15, ESL 16, ESL 17, ESL 18, ESL 19, ESL 20, ESL 21, and ESL 22) may indicate a respective response slot for one or more of the wireless communication devices 420b (e.g., ESL 12, ESL 13, ESL 14, ESL 15, ESL 16, ESL 17, ESL 18, ESL 19, ESL 20, ESL 21, and/or ESL 22) in the second group to use to transmit 440b a response to the network device 410. If a wireless communication device 420b (e.g., ESL 12, ESL 13, ESL 14, ESL 15, ESL 16, ESL 17, ESL 18, ESL 19, ESL 20, ESL 21, and ESL 22) is addressed within the synchronization message, the wireless communication device 420b (e.g., ESL 12, ESL 13, ESL 14, ESL 15, ESL 16, ESL 17, ESL 18, ESL 19, ESL 20, ESL 21, and ESL 22) can respond (e.g., transmit 440b) in its respective response slot, as indicated within the synchronization message.

For example, the synchronization message may indicate a specific sequence for one or more of the wireless communication devices 420b (e.g., ESL 12, ESL 13, ESL 14, ESL 15, ESL 16, ESL 17, ESL 18, ESL 19, ESL 20, ESL 21, and/or ESL 22) to respond (e.g., transmit 440b) in time (e.g., responding after 5 ms has elapsed after the start of the subframe at response slots located every 0.625 ms). For example, the sequence may indicate that wireless communication device 420b (e.g., ESL 12) should respond in a response slot located at 17.5 ms, wireless communication device 420b (e.g., ESL 13) should respond in a response slot located at 18.125 ms, wireless communication device 420b (e.g., ESL 14) should respond in a response slot located at 18.75 ms, wireless communication device 420b (e.g., ESL 15) should respond in a response slot located at 19.375 ms, wireless communication device 420b (e.g., ESL 16) should respond in a response slot located at 20 ms, wireless communication device 420b (e.g., ESL 17) should respond in a response slot located at 20.625 ms, wireless communication device 420b (e.g., ESL 18) should respond in a response slot located at 21.25 ms, wireless communication device 420b (e.g., ESL 19) should respond in a response slot located at 21.875 ms, wireless communication device 420b (e.g., ESL 20) should respond in a response slot located at 22.5 ms, wireless communication device 420b (e.g., ESL 21) should respond in a response slot located at 23.125 ms, and wireless communication device 420b (e.g., ESL 22) should respond in a response slot located at 23.75 ms.

After the wireless communication devices 420b (e.g., ESL 12, ESL 13, ESL 14, ESL 15, ESL 16, ESL 17, ESL 18, ESL 19, ESL 20, ESL 21, and ESL 22) have received 435b the PA containing the synchronization message from the network device 410, according to the sequence specified within the synchronization message, the one or more wireless communication devices 420b (e.g., ESL 12, ESL 13, ESL 14, ESL 15, ESL 16, ESL 17, ESL 18, ESL 19, ESL 20, ESL 21, and/or ESL 22) may transmit 440b their responses within their respective response slots. After the one or more wireless communication devices 420b (e.g., ESL 12, ESL 13, ESL 14, ESL 15, ESL 16, ESL 17, ESL 18, ESL 19, ESL 20, ESL 21, and/or ESL 22) have transmitted 440b their responses in their respective time slots, the network device 410 can receive 445b their transmitted responses at those specific response slot times. Then, the PAwR may continue similarly for subsequent subframes of time.

As previously noted, PAwR can be used to synchronize peripheral devices (e.g., wireless communication device 420a, 420b, a peripheral device such as an ERL, etc.) with a network device (e.g., network device 410, a central device such as an access point, etc.), but may perform subframe allocation independent of one or more transmit power determinations. For example, subframe allocation may be performed independent of one or more transmit power determinations (e.g., such as minimum transmit power requirements or determinations) from a central device to a peripheral device, and vice versa. In some cases, PAwR transmissions from a central device to a peripheral device may utilize a constant transmit power across all subframes and/or across all peripheral devices. PAwR transmissions from various peripheral devices to a central device may additionally utilize a constant transmit power.

As noted above, there is a need to provide PAwR transmissions between a central device and a plurality of peripheral devices that can utilize a transmit power that is based on one or more transmit power determinations associated with the central device and the plurality of peripheral devices. The systems and techniques described herein can be used to provide PAwR transmissions using one or more different transmit powers across subframes and subframe groups (e.g., groups of peripheral devices associated with the same respective subframe). For example, the transmit power of a PAwR transmission can be adjusted (e.g., increased or decreased) based on transmit power determinations that may vary based on factors such as device placement (e.g., distance between a central device and a particular peripheral device), line-of-sight path (e.g., an unobstructed or partially obstructed line-of-sight path between a central device and a particular peripheral device).

In one illustrative example, the systems and techniques described herein can be used to allocate subframes to respective groups of peripheral devices (e.g., associated with a respective subframe group) based on a minimum transmit power expectancy to establish reliable communications between a central device and the peripheral device. For example, the peripheral devices associated with a respective group (e.g., wherein the respective group corresponds to a particular subframe) can have a same or similar Tx power requirement with respect to a central device. For instance, the peripheral devices associated with a respective group can be associated with a same or similar expected power to be transmitted by the central device (e.g., the Tx power requirement of the peripheral devices). In some cases, a transmit power aware allocation of subframes in PAwR to peripheral devices can be used to reduce an overall transmit power associated with a central device, peripheral devices, and/or a combination of the two, as will be described in greater depth below.

Figure 5:
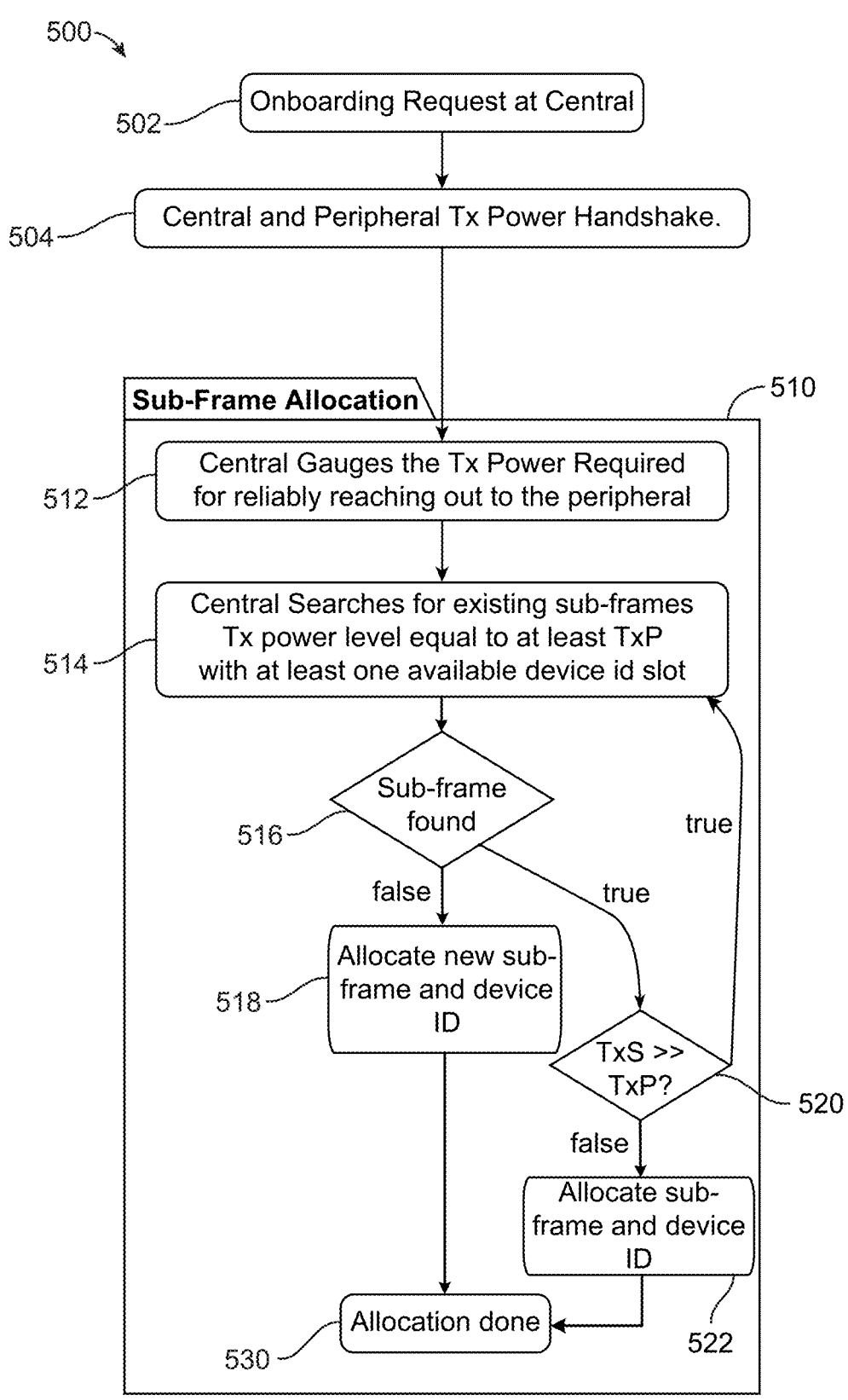
FIG. 5 is a flow diagram illustrating an example of subframe allocation for peripheral devices based on transmit power, in accordance with some examples.

FIG. 5 is a flow diagram illustrating an example of a subframe allocation process 500 that can be used during an onboarding of one or more peripheral devices with a PAwR central device, in accordance with some examples. In one illustrative example, the subframe allocation process 500 can be a transmit power aware subframe allocation process that can be used to allocate subframes to peripheral devices based on one or more transmit power determinations associated with each respective peripheral device and a corresponding central device. For instance, the subframe allocation process 500 can be performed during an onboarding between a central device and each respective peripheral device of a plurality of peripheral devices.

At operation 502, an onboarding request can be received at the central device. For example, the central device can receive an onboarding request transmitted or broadcast by a peripheral device. In some cases, the onboarding request can be indicative of a request from the peripheral device to join a PAwR train associated with the central device (e.g., can be indicative of a request from the peripheral device to subscribe to the central device). In some cases, the onboarding request can trigger an onboarding procedure to establish (or reestablish) synchronization between the peripheral device and the central device. To perform an onboarding procedure, the peripheral device may transmit advertisement messages, receive a connection request from an in-range central device (e.g., access point) that detected the advertisement messages, and exchange messages with the central device (e.g., including the exchange of synchronization information or other onboarding information).

As noted previously, a central device may be associated with a plurality of different peripheral devices. In some examples, the central device can perform an onboarding process associated with the onboarding request of operation 502 for one peripheral device at a time. For instance, multiple peripheral devices that transmit onboarding requests to the central device at the same time may be onboarded one at a time, in a sequential order. Based on onboarding peripheral devices one at a time, in some examples the subframe allocation process 500 may also be performed sequentially for multiple peripheral devices attempting to onboard with the central device (e.g., rather than in parallel).

At operation 504, a transmit power handshake can be performed. For example, the transmit power handshake can be performed between the central device and a peripheral device (e.g., the same peripheral device as is associated with the onboarding request of operation 502). In one illustrative example, the transmit power handshake can be used to determine one or more transmit power characteristics associated with a transmission from the central device to the peripheral device (e.g., a signal transmitted by the central device and received by the peripheral device), one or more transmit power characteristics associated with a transmission from the peripheral device to the central device (e.g.f., a signal transmitted by the peripheral device and received by the central device), or a combination of the two.

For example, the transmit power handshake can be used to determine one or more characteristics indicative of a relationship between a transmitted power (e.g., Tx power) at the central device and a corresponding received power (e.g., Rx power) at the peripheral device, one or more characteristics indicative of a relationship between a Tx power at the peripheral device and a corresponding Rx power at the central device, or a combination of the two.

In some examples, the transmit power handshake of operation 504 can include one or more pre-determined transmissions and transmit power levels that are used to provide a handshake transmission from one of the central device or the peripheral device and are used to measure or characterize the received handshake transmission at the remaining one of the central device or the peripheral device. For example, the transmit power handshake can include a first handshake transmission that is transmitted by the central device using a particular transmit power. The peripheral device can attempt to receive the first handshake transmission and/or determine Received Signal Strength Indication (RSSI) information associated with the first handshake transmission from the central device. In some cases, the particular transmit power used by the central device to transmit the first handshake transmission may be a pre-determined transmit power. In some examples, the particular transmit power used by the central device to transmit the first handshake transmission can be a negotiated transmit power and/or can be a transmit power selected by the central device and signaled to the peripheral device during the transmit power handshake of operation 504. The transmit power handshake can include one or more handshake transmissions from the central device that are measured by the peripheral device. The transmit power handshake may additionally include one or more handshake transmissions from the peripheral device to the central device. The handshake transmissions from the peripheral device to the central device can be the same as or similar to the handshake transmissions from the central device to the peripheral device, as described above.

In some examples, the transmit power handshake of operation 504 can include one or more power control requests transmitted by the central device to the peripheral device, or vice versa. For example, a power control request can be used to request that a peer device adjust its transmit power level. The power control request may specify a requested transmit power adjustment (e.g., increase or decrease) or may be associated with a pre-determined transmit power adjustment at the peer device. In some cases, the central device or the peripheral device can transmit a power control request to the peripheral device or the central device, respectively, to query an acceptable power reduction (APR) value. For example, the central device can transmit a power control request to the peripheral device to query an APR value associated with the transmissions from the central device to the peripheral device. The central device may subsequently adjust its transmit power or otherwise generate one or more transmit power determinations based on the APR value provided from the peripheral device in response to the query. Similarly, a peripheral device can transmit a power control request to the central device to query an APR value associated with the transmissions from the peripheral device to the central device. The peripheral device may subsequently adjust its transmit power or otherwise generate one or more transmit power determinations based on the APR value provided from the central device in response to the query.

In some aspects, the transmit power handshake of operation 504 can be implemented based on the Power Control procedure of the Bluetooth Core Specification. For example, the onboarding request of operation 502 and the transmit power handshake of operation 504 may be associated with a one-to-one connection between the central device and the peripheral device (e.g., rather than the one-to-many PAwR transmissions from the central device to already onboarded peripheral devices). For example, the Power Control procedure of the Bluetooth Core Specification is a link layer power control procedure (e.g., utilizing link layer power control requests and connections), which may be performed for one-to-one connections but not one-to-many transmissions (e.g., such as PAwR messages, which are non-connectable advertisements over extended channels). In some examples, the transmit power handshake of operation 504 can be implemented based on a higher-level handshaking mechanism defined at an application layer of the central device and/or the peripheral device.

In one illustrative example, based on one or more transmit power determinations obtained based on the transmit power handshake of operation 504, the central device can perform transmit power aware subframe allocation for onboarding of the peripheral device. For instance, information determined or otherwise obtained from the transmit power handshake of operation 504 (e.g., information such as the one or more transmit power determinations) can be used to perform the transmit power aware subframe allocation 510 depicted in FIG. 5.

As illustrated, the transmit power aware subframe allocation 510 can include operation 512, during which the central device can determine a transmit power associated with establishing reliable communications from the central device to the peripheral device. In some aspects, at operation 512 the central device can determine a minimum transmit power expected to establish reliable communications between the central device and the peripheral device. In some examples, the minimum transmit power determined in operation 512 can be a minimum required transmit power associated with reliable communications between the central device and the peripheral device.

In one illustrative example, the central device can determine the minimum transmit power based on the transmit power handshake of operation 504. For instance, the central device can use the one or more transmit power determinations obtained based on the transmit power handshake of operation 504 to determine the minimum transmit power between the central device and the peripheral device. In some aspects, the minimum transmit power for establishing reliable communications between the central device and the peripheral device can be referred to as the transmit power TxP.

The minimum transmit power TxP can be determined based on one or more of the handshake transmissions associated with the transmit power handshake of operation 504. For example, the central device can determine the minimum transmit power TxP based on analyzing the transmit power and respective RSSI measured at the peripheral device for one or more of the handshake transmissions from the central device to the peripheral device during the transmit power handshake of operation 504.

In one illustrative example, the minimum transmit power TxP can be determined as the minimum transmit power utilized by the central device during the transmit power handshake of operation 504 that is associated with an RSSI (e.g., as measured by the peripheral device) that is greater than a pre-determined threshold. For example, the pre-determined threshold can be indicative of the minimum RSSI of an incoming signal that can be reliably received by the peripheral device. A handshake transmission from the central device and having a respective transmit power that is associated with a measured RSSI at the peripheral device that is less than the pre-determined threshold can indicate that the minimum transmit power TxP should be greater than the respective transmit power. A handshake transmission from the central device and having a respective transmit power that is associated with a measured RSSI at the peripheral device that is greater than the pre-determined threshold may indicate that the minimum transmit power TxP can be decreased to a value less than the respective transmit power. In some aspects, the transmit power handshake of operation 504 can be performed such that multiple handshake transmissions are exchanged between the central device and the peripheral device, until at least one handshake transmission is transmitted with a transmit power that produces a measured RSSI at the peer device (e.g., the central device or the peripheral device that measures the RSSI of the handshake transmission) that is below the pre-determined RSSI threshold.

In some aspects, the minimum transmit power TxP determined at operation 512 can be the minimum transmit power observed during the transmit power handshake of operation 504 to produce a measured RSSI value at the peripheral device that is greater than the pre-determined RSSI threshold. In some examples, the minimum transmit power TxP can be determined based on one or more Acceptable Power Reduction (APR) values provided by the peripheral device to the central device during the transmit power handshake of operation 504.

At operation 514 of the transmit power aware subframe allocation 510, the central device can determine one or more available subframes for allocating to the peripheral device, wherein the allocation determination is based on the minimum transmit power TxP determined at operation 512 (e.g., as described above). As mentioned previously, in one illustrative example, the systems and techniques can perform subframe allocation based on transmit power information associated with the central device and each peripheral device associated with (e.g., onboarded or subscribed to) the central device. For instance, some (or all) of the subframes of the central device can be associated with different values of the minimum transmit power TxP.

For example, a time frame associated with the central device can have a periodicity (e.g., duration) of 1.6 seconds and can be divided into a plurality of subframes (e.g., such as 128 subframes each having a periodicity of 12.5 milliseconds (ms)). One or more subframes of the plurality of subframes can be associated with a respective transmit power level. In some examples, each subframe of the plurality of subframes can be associated with a respective transmit power level. In some cases, a given transmit power level (e.g., a given transmit power value) can be associated with multiple different subframes of the plurality of subframes. In other examples, each subframe that is associated with a transmit power level can be associated with a different transmit power level.

Subframe allocation can be performed based on comparing the minimum transmit power TxP determined for a given peripheral device to the respective transmit power levels associated with plurality of subframes. For instance, the central device can attempt to identify one or more subframes having an associated transmit power level that is greater than or equal to the minimum transmit power TxP determined for the currently onboarded peripheral device. In some examples, the central device can compare the minimum transmit power TxP determined for the peripheral device with the associated transmit power level of each subframe of the plurality of subframes. In some cases, the central device can compare the minimum transmit power TxP determined for the peripheral device with the associated transmit power level of each subframe of the plurality of subframes that has at least one available device ID for allocation. For instance, the central device may allocate a peripheral device to one of 128 different groups (e.g., corresponding to the 128 subframes), and may allocate the peripheral device to one of 256 device IDs associated with each subframe (e.g., each group). In examples where a subframe has already been allocated to 256 peripheral devices, or the subframe otherwise does not have any available device IDs for allocation, the central device may skip the subframe (e.g., based on considering the subframe unavailable based on the lack of device IDs for allocation).

In some instances, the central device can perform subframe allocation based on comparing the minimum transmit power TxP determined for the peripheral device with the respective transmit power level associated with a subset of the plurality of subframes. For example, the subset of the plurality of subframes can be subframes that are both available and already allocated. An available subframe can be a subframe having one or more device IDs available for allocation to the peripheral device. An existing or already allocated subframe can be a subframe for which the central device has previously assigned an associated transmit power level and/or can be a subframe that has previously been allocated to at least one peripheral device having a respective minimum transmit power TxP.

At operation 516, the transmit power aware subframe allocation 510 can be include determining whether or not a subframe was identified for allocation in operation 514. For instance, if one or more subframes are identified that have an associated transmit power level greater than or equal to the determined minimum transmit power TxP for the peripheral device and that have one or more available device ID slots for allocation, then operation 516 can output a determination of "True" and the transmit power aware subframe allocation 510 can proceed to operation 520.

If no subframes were identified (e.g., in operation 514) that have an associated transmit power level greater than or equal to the determined minimum transmit power TxP for the peripheral device and that have one or more available device ID slots for allocation, then operation 516 can output a determination of "False" and the transmit power aware subframe allocation 510 can proceed to operation 518.

At operation 518, the central device can allocate a new subframe, assign an associated transmit power level to the newly allocated subframe, and allocate the subframe to the peripheral device. In some aspects, operation 518 can further include allocating an identifier within the subframe to the peripheral device. For example, a subframe can include a plurality of identifiers within the subframe, and the peripheral device can be allocated to a respective identifier of the plurality of identifiers within the subframe. In some cases, the plurality of identifiers within the subframe may also be referred to as a device ID and/or a sub-frame specific EIID (e.g., an identifier of the device within the sub-frame). In one illustrative example, operation 518 can be reached when the minimum transmit power TxP determined for the peripheral device is greater than the associated transmit power level of the existing and available subframes. Operation 518 may also be performed when no subframes of the plurality of subframes have yet been allocated or otherwise assigned an associated transmit power level.

In some examples, the associated transmit power level assigned to the newly allocated subframe at operation 518 can be the same as (e.g., equal to) the minimum transmit power TxP determined for the peripheral device. For example, operation 518 may be performed when there are no existing and/or available subframes that have been assigned an associated power level that is greater than or equal to the minimum transmit power TxP determined for the peripheral device. Based on assigning the associated transmit power level of the newly allocated subframe to be the same as the minimum transmit power TxP determined for the peripheral device, the central device can create a new subframe group (e.g., associated with the newly allocated subframe and including at least the peripheral device). For instance, the central device can activate a new subframe by assigning the peripheral device to the new subframe. Subsequently, one or more peripheral devices that onboard to the central device and undergo the transmit power aware subframe allocation 510 may also be allocated to a device ID within the newly allocated subframe, based on the one or more peripheral devices having a minimum transmit power TxP that is the same as (or greater than) the minimum transmit power TxP of the currently onboarded peripheral device.

After the peripheral device is allocated to a device ID within the newly allocated subframe in operation 518, the onboarding process 500 can terminate at operation 530. When allocation is completed for the currently onboarded peripheral device, the central device can perform the onboarding process 500 and transmit power aware subframe allocation 510 of FIG. 5 for one or more additional peripheral devices, as described above.

Returning to operation 516, in which the central device determines whether a subframe was identified for allocation to the peripheral device (e.g., based on operation 514), the output determination of "True" can correspond to a determination that one or more subframes were identified that have an associated transmit power level that is greater than or equal to the minimum transmit power TxP determined for the peripheral device and that have one or more available device ID slots for allocation. For example, the output determination of "True" can indicate that the central device will transmit to the corresponding subframe groups of the identified subframes using a transmit power that equals or exceeds the minimum transmit power TxP determined for the peripheral device and can further indicate that the identified subframes are not full (e.g., one or more device ID slots are available for allocation within each of the identified subframes).

As illustrated, based on the output determination of "True" at operation 516, the transmit power aware subframe allocation 510 can proceed to a second determination operation 520. At the determination operation 520, the central device can determine a difference between the associated transmit power level of each of the identified subframes and the minimum transmit power TxP for the peripheral device. In some aspects, the transmit power level associated with a respective subframe can be represented as the subframe transmit power TxS (e.g., for a set of i subframes that have been allocated and assigned a transmit power, the subframe transmit power $TxS_i$ can represent the particular subframe transmit power TxS assigned to the i-th subframe of the set of allocated subframes).

In some aspects, the identified subframes can be candidate subframes for allocation of the peripheral device. Each of the identified (e.g., candidate) subframes may have an assigned transmit power level (e.g., associated transmit power level at the central device) TxS that is greater than or equal to the minimum transmit power TxP for the peripheral device (e.g., TxS>TxP). As used herein, the minimum transmit power TxP can refer to the minimum transmit power at the central device for the peripheral device. In some cases, an identified subframe to which the peripheral device could be allocated may have an associated transmit power level TxS that is significantly greater than the minimum transmit power TxP at the central device for the peripheral device (e.g., TxS>>TxP). In such a scenario, it can be inefficient to allocate a peripheral device to a subframe having an associated transmit power level TxS that is, for example, two times greater than the minimum transmit power TxP for the peripheral device. In some examples, the central device can allocate a peripheral device to a subframe having an associated transmit power level TxS>>the minimum transmit power TxP for the peripheral device, for instance based on determining that there are no other available subframes.

In one illustrative example, at operation 520 the central device can determine a difference between the minimum transmit power TxP for the peripheral device and the associated transmit power level TxS assigned to each of the identified subframes. In some cases, the difference can be determined as an absolute value. In some examples, the transmit power difference can be compared to one or more pre-determined thresholds. For instance, if the difference between the minimum transmit power TxP for the peripheral device and the associated transmit power level TxS assigned to a given subframe exceeds the pre-determined threshold, the identified subframe can be removed from the set of subframes to which the peripheral device can be allocated. In other examples, the transmit power difference can be determined as a ratio or a multiplicative coefficient between the minimum transmit power TxP for the peripheral device and the associated transmit power level TxS assigned to each identified subframe from operation 516. For instance, at operation 520 the central device may remove identified subframes from consideration for allocation to the peripheral device if the associated transmit power TxS assigned to the identified subframe is more than 1.5 times greater than the minimum transmit power TxP for the peripheral device, more than 2.5 times greater than the minimum transmit power TxP for the peripheral device, etc.

Based on an output determination of "True" at operation 520 (e.g., indicating that the subframe transmit power level TxS>>the minimum transmit power TxP for the peripheral device), the subframe allocation process 510 can return to operation 514 and may proceed as described above.

Based on an output determination of "False" at operation 520, the subframe allocation process 520 can proceed to operation 522. In one illustrative example, an output determination of "False" at operation 520 may indicate that one or more identified subframe candidates for allocation of the peripheral device have a respective subframe transmit power TxS that is similar to (e.g., greater than or equal to) the minimum transmit power TxP for the peripheral device. For example, the output determination of "False" can indicate that TxS−TxP was less than a pre-determined threshold, for the subframe transmit power TxS assigned to one or more of the identified candidate subframes for allocation of the peripheral device.

In some examples, if multiple identified or candidate subframes for allocation of the peripheral device are associated with a subframe transmit power TxS that differs from the minimum transmit power TxP for the peripheral device by less than the pre-determined threshold, then a particular subframe can be selected that has the smallest value of TxS−TxP. In some examples, the particular subframe for allocating to the peripheral device (e.g., in operation 522) can be selected based on a combination of the transmit power difference TxS−TxP and a quantity of device IDs within the particular subframe that are available for allocation. For instance, if two subframes are associated with a subframe transmit power TxS that is the same as the minimum transmit power TxP for the peripheral device, with a first one of the subframes having a single device ID available for allocation and a second one of the subframes having 200 device IDs available for allocation, the central device may select a subframe for allocation based on the quantity of device IDs available. In one example, the central device can preferentially select the first subframe (e.g., having a single device ID available for allocation) for allocating to the peripheral device, based on the allocation of the peripheral device to the first subframe "completing" or "filling" the first subframe such that it is no longer considered available during the subframe allocation process 510, as no device IDs will be available after the peripheral device is allocated to the first subframe. In another example, the central device may preferentially select the second subframe (e.g., having 200 device IDs available for allocation) for allocating to the peripheral device. In some examples, the central device may select randomly between multiple subframes that are available for allocation to the peripheral device after the output determination of operation 520.

At operation 522 (e.g., based on the output determination of "False" at operation 520, as described above), the central device can allocate an existing subframe to the peripheral device. For example, the central device can allocate the existing subframe to the peripheral device and can allocate an available device ID within the subframe to the peripheral device. The existing subframe can be the subframe selected from the candidate subframes based on operation 520. For example, the existing subframe allocated to the peripheral device at operation 522 can be an existing subframe that is assigned a subframe transmit power TxS that is at least equal to the minimum transmit power TxP for the peripheral device.

After the peripheral device is allocated to a device ID within the existing subframe in operation 522, the onboarding process 500 can terminate at operation 530. When allocation is completed for the currently onboarded peripheral device, the central device can return to operation 502 and perform the onboarding process 500 and transmit power aware subframe allocation 510 of FIG. 5 for one or more additional peripheral devices, as described above.

In one illustrative example, the transmit power handshake (e.g., such as the transmit power handshake of operation 504) can be performed using PAwR. For example, one or more (or all) of the PAwR transmission from the central device to one or more of the peripheral devices can be generated to include transmit power handshake information. For instance, the central device can include transmit power handshake information indicative of a transmit power used to transmit the corresponding message (e.g., the message that includes the transmit power handshake information). The peripheral device can receive the PAwR transmission from the central device and measure or otherwise determine an RSSI information associated with receiving the PAwR transmission. Subsequently, the peripheral device can generate and transmit a response message, such as a response to the PAwR transmission from the central device. The peripheral device can generate the response message to include transmit power handshake information indicative of the RSSI information determined by the peripheral device for the previous PAwR transmission. Based on receiving the response message from the peripheral device indicative of the measured RSSI, the central device can adjust its transmit power for the peripheral device to find an optimized transmit power that is just sufficient for communicating with the peripheral device (e.g., an optimized transmit power that produces a measured RSSI at the peripheral device that is equal to or slightly greater than a minimum RSSI for reliable communication).

In some examples, the peripheral device can generate the response message to include transmit power handshake information indicative of the RSSI determined for the transmission from the central device (e.g., as described above) and to further include transmit power handshake information indicative of a transmit power utilized by the peripheral device to transmit the response message to the central device. In this manner, the central device can receive the response message from the peripheral device and utilize the included transmit power handshake information to both adjust its own transmit power for transmitting to the peripheral device (e.g., based on the RSSI measured by the peripheral device) and to provide feedback information to the peripheral device. For example, the central device can measure or otherwise determine an RSSI associated with receiving the response message from the peripheral device. The central device can transmit or include the measured RSSI in a subsequent or future PAwR transmission to the peripheral device, such that the peripheral device can use the RSSI information determined by the central device to adjust its own transmit power for transmitting to the central device. For example, a peripheral device can calibrate its respective transmit power for transmitting to the central device based on RSSI feedback information received from the central device.

In some aspects, transmit power handshaking can be performed during a one-to-one connection between the central device and a peripheral device, such as during an onboarding process (e.g., as described above with respect to FIG. 5). In some examples, transmit power handshaking can be performed using PAwR during a one-to-one connection. In some cases, transmit power handshaking can additionally, or alternatively, be performed using PAwR without a connection. For instance, PAwR messages between a central device and peripheral devices may be non-connectable advertisements over extended channels and transmit power handshaking can be performed using PAwR without a connection based on the central device and the peripheral devices including transmit power handshake information in their respective PAwR transmissions.

In another illustrative example, the systems and techniques can be used to perform a periodic update process. For example, the central device can periodically receive RSSI information from some (or all) of the peripheral devices associated with the central device. In some cases, the central device can periodically receive RSSI information from some (or all) of the peripheral devices based on the peripheral devices including their measured RSSI information of the central in one or more PAwR response messages transmitted from the peripheral devices to the central (e.g., as described above). In some examples, the central device can reserve one or more transmission slots during which some (or all) of the peripheral devices can provide the central device with RSSI information determined based on each respective peripheral device receiving a signal or message transmitted by the central device. In some examples, the central device can reserve one or more transmission slots within each respective subframe, wherein the peripheral devices included in the subframe group associated with the respective subframe can measure and/or transmit the RSSI information using the reserved transmission slots within the respective subframe. In one illustrative example, peripheral devices can determine (e.g., measure) RSSI information based on receiving an AP_SYNC packet (e.g., transmitted by an AP or other PAwR central device). The central device can reserve one or more transmission slots within each subframe that can be used by peripheral devices included in the corresponding subframe group to transmit, to the central device, their previously measured RSSI information. Based on receiving the RSSI information from the peripheral devices, the central device can perform a global calibration of its transmission power. For instance, the central device can determine a minimum transmission power that is needed for all of the peripheral devices to successfully receive signals (e.g., messages) transmitted by the central device. In one illustrative example, the central device can determine a global minimum transmit power $TxP_g$ that represents the minimum transmit power to be used for a transmission to any given peripheral device. In some aspects, the central device can use the global minimum transmit power $TxP_g$ for all PAwR transmissions to the peripheral devices.

FIG. 6 is a flow chart illustrating an example of a process 600 for wireless communications. The process 600 can be performed by a network entity (e.g., such as an access point, PAwR central device, etc.) and/or a network device (e.g., such as an AP) or by a component or system (e.g., a chipset) thereof. The operations of the process 600 may be implemented as software components that are executed and run on one or more processors (e.g., processor 710 of FIG. 7 or other processor(s)). Further, the transmission and reception of signals by the wireless communications device in the process 600 may be enabled, for example, by one or more antennas and/or one or more transceivers (e.g., wireless transceiver(s)).

At block 602, the process 600 includes determining a transmit power value for communicating with a wireless communication device. For example, a network entity can determine the transmit power value for communicating with the wireless communication device. In some examples, the network entity can be a Periodic Advertisement with Response (PAwR) central device. For instance, the network entity can include the management entity 130 and/or one or more of the access points (APs) 110 depicted in FIG. 1. In some cases, the network entity can be the same as or similar to the AP 410 of FIG. 4. In some aspects, the network entity can be the same as or similar to a network entity used to implement the operations 500 of FIG. 5.

The wireless communication device can be a peripheral device. For instance, the wireless communication device can be a peripheral device associated with the PAwR central device (e.g., associated with the network entity). In some cases, the wireless communication device can be the same as or similar to one or more of the wireless communication devices 120 of FIG. 1 and/or the wireless communication device implementing the architecture 200 of FIG. 2. In some examples, the wireless communication device can be the same as or similar to one or more (or all) of the devices 305a-305e of FIG. 3. In another example, the wireless communication device can be the same as or similar to one or more of the wireless communication devices 420a, 420b of FIG. 4.

In some cases, the transmit power value is a minimum transmit power value for communicating with the wireless communication device. For instance, the minimum transmit power value can correspond to a minimum Received Signal Strength Indication (RSSI) value of the wireless communication device. For example, the minimum transmit power value can be the same as a minimum transmit power value determined at operation 512 of FIG. 5.

In some cases, the network entity can receive an onboarding request from the wireless communication device and determine the transmit power value for communicating with the wireless communication device based on receiving the onboarding request. For instance, the onboarding request can be the same as or similar to the onboarding request received at operation 502 of FIG. 5.

In some examples, to determine the transmit power value, the network entity can perform a transmit power handshake associated with the network entity and the wireless communication device. For instance, the transmit power handshake can be the same as or similar to the transmit power handshake of operation 504 of FIG. 5. In some cases, the transmit power handshake can be performed based on transmitting, to the wireless communication device, a first signal including information indicative of a transmit power value of the first signal. The network entity can receive, from the wireless communication device, a second signal including Received Signal Strength Indication (RSSI) information associated with the first signal. For example, the second signal can include an RSSI value measured for the first signal by the wireless communication device (e.g., based on the wireless communication device receiving the first signal transmitted by the network entity). The network entity can determine a minimum transmit power value based on the transmit power value of the first signal and the RSSI information associated with the first signal.

In some cases, the network entity can receive, from a plurality of wireless communication devices, RSSI information associated with a periodic advertisement (PA) transmitted to the plurality of wireless communication devices (e.g., transmitted by the network entity and received by each respective wireless communication device of the plurality of wireless communication devices). The network entity can determine, based on the RSSI information, a minimum transmit power value for communicating with the plurality of wireless communication devices, wherein the minimum transmit power value is based on a lowest RSSI value received from the plurality of wireless communication devices. In some cases, the network entity can use the minimum transmit power to transmit one or more PAs using each subframe of the plurality of subframes.

At block 604, the process 600 includes selecting a subframe of the plurality of subframes, wherein the subframe is selected based on the transmit power value and a respective subframe transmit power value associated with the subframe, and wherein the respective subframe transmit power value is greater than or equal to the transmit power value. In some examples, the network entity can be further configured to select the subframe based on identifying one or more available device identifiers (IDs) associated with the subframe. The network entity can allocate a particular device ID of the one or more available device IDs to the wireless communication device.

In some cases, the subframe can be selected based on identifying one or more candidate subframes of the plurality of subframes. For instance, the subframe can be selected based on the operation 514 of FIG. 5. In some cases, each candidate subframe of the one or more candidate subframes can be associated with a. respective subframe transmit power value that is greater than or equal to the minimum transmit power value, and wherein each candidate subframe includes one or more available device identifiers (IDs). A particular candidate subframe of the one or more candidate subframes can be selected, in a manner the same as or similar to that described with respect to operations 514 and 516 of FIG. 5. For example, the particular candidate subframe can be the same as or similar to the sub-frame found in operation 516 of FIG. 5. In some cases, the particular candidate subframe of the one or more candidate subframes can be selected based on a difference between the minimum transmit power value and the respective subframe transmit power value associated with the particular candidate subframe. For instance, if the respective subframe transmit power value associated with the particular candidate subframe is much greater than the minimum transmit power value, the particular candidate subframe can be rejected and the search can continue (e.g., in a manner the same as or similar to that described with respect to operations 520 and 514 of FIG. 5.)

At block 606, the process 600 includes allocating the wireless communication device to the subframe. For example, allocating the wireless communication device to the subframe can be the same as or similar to operation 518 of FIG. 5 and/or operation 522 of FIG. 5. In some cases, the network entity can allocate each wireless communication device of the plurality of wireless communication devices to the subframe, wherein the respective subframe transmit power value is greater than or equal to a respective transmit power value for communicating with each wireless communication device.

In some cases, at block 606 the process 600 can include determining that the plurality of subframes does not include an available subframe to allocate to the wireless communication device (e.g., in a manner the same as or similar to operation 518 of FIG. 5.). The network entity can associate the transmit power value to an un-allocated subframe of the plurality of subframes, wherein a respective subframe transmit power value of the un-allocated subframe is equal to the transmit power value. The un-allocated subframe can then be allocated to the wireless communication device, such as by allocating the new-subframe and device ID as described with respect to operation 518 of FIG. 5.

At block 608, the process 600 includes transmitting a periodic advertisement (PA) to a plurality of wireless communication devices using the subframe and the respective subframe transmit power value, wherein the plurality of wireless communication devices includes the wireless communication device. For example, the PA can be a Periodic Advertisement with Response (PAwR) transmission (e.g., broadcast) from the network entity to the plurality of wireless communication devices. In some cases, the process 600 further includes determining a second subframe transmit power value for the subframe, wherein the second subframe transmit power value is different from the respective subframe transmit power value. For example, the second subframe transmit power value for the subframe can be greater than or less than the respective subframe transmit power value. In some cases, the second subframe transmit power value can be determined during a re-allocation process performed by the network entity, after performing an onboarding allocation process for the plurality of wireless communication devices. The network entity can transmit a second PA to the plurality of wireless communication devices using the same subframe and the second (e.g., different) subframe transmit power value.

In some cases, the second subframe transmit power value can be determined based on the network entity receiving, from one or more wireless communication devices of the plurality of wireless communication devices associated with the subframe (e.g., some or all of the plurality of wireless communication devices), a respective second RSSI value different from a first RSSI value received from the same one or more wireless communication devices and previously used to determine the respective subframe transmit power value. For example, the respective first RSSI values can be received during an onboarding process and used to determine the initial (e.g., respective) subframe transmit power value, such as during a transmit power handshake such as that of operation 504 of FIG. 5. The respective second RSSI values can be received subsequent to the onboarding process (e.g., after onboarding and allocation is completed), and can be received as part of a re-allocation process performed by the network entity for some (or all) of the plurality of wireless communication devices. The network entity can determine the second subframe transmit power value based on the respective second RSSI value received from each wireless communication device of the one or more wireless communication devices. For instance, if the respective second RSSI values have decreased relative to the corresponding first or initial RSSI values received during onboarding of the same one or more wireless communication devices of the plurality of wireless communication devices associated with the subframe (or if an average second RSSI value has decreased relative to an average first or initial RSSI value), the network entity can determine a second subframe transmit power value that is greater than the initial subframe transmit power value.

If the respective second RSSI values have increased relative to the corresponding first or initial RSSI values received during onboarding of the same one or more wireless communication devices of the plurality of wireless communication devices associated with the subframe (or if an average second RSSI value has increased relative to an average first or initial RSSI value), the network entity can determine a second subframe transmit power value that is less than the initial subframe transmit power value.

In some cases, the network entity can receive each respective second RSSI value using the subframe associated with the plurality of wireless communication devices, wherein each respective second RSSI value is received after allocating the wireless communication device to the subframe (e.g., after performing onboarding and/or after reaching the allocation done operation 530 of FIG. 5).

The network entity, network device, and/or the wireless communication device may include various components, such as one or more input devices, one or more output devices, one or more processors, one or more microprocessors, one or more microcomputers, one or more cameras, one or more sensors, one or more receivers, transmitters, and/or transceivers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of a device configured to perform the process 600 of FIG. 6 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
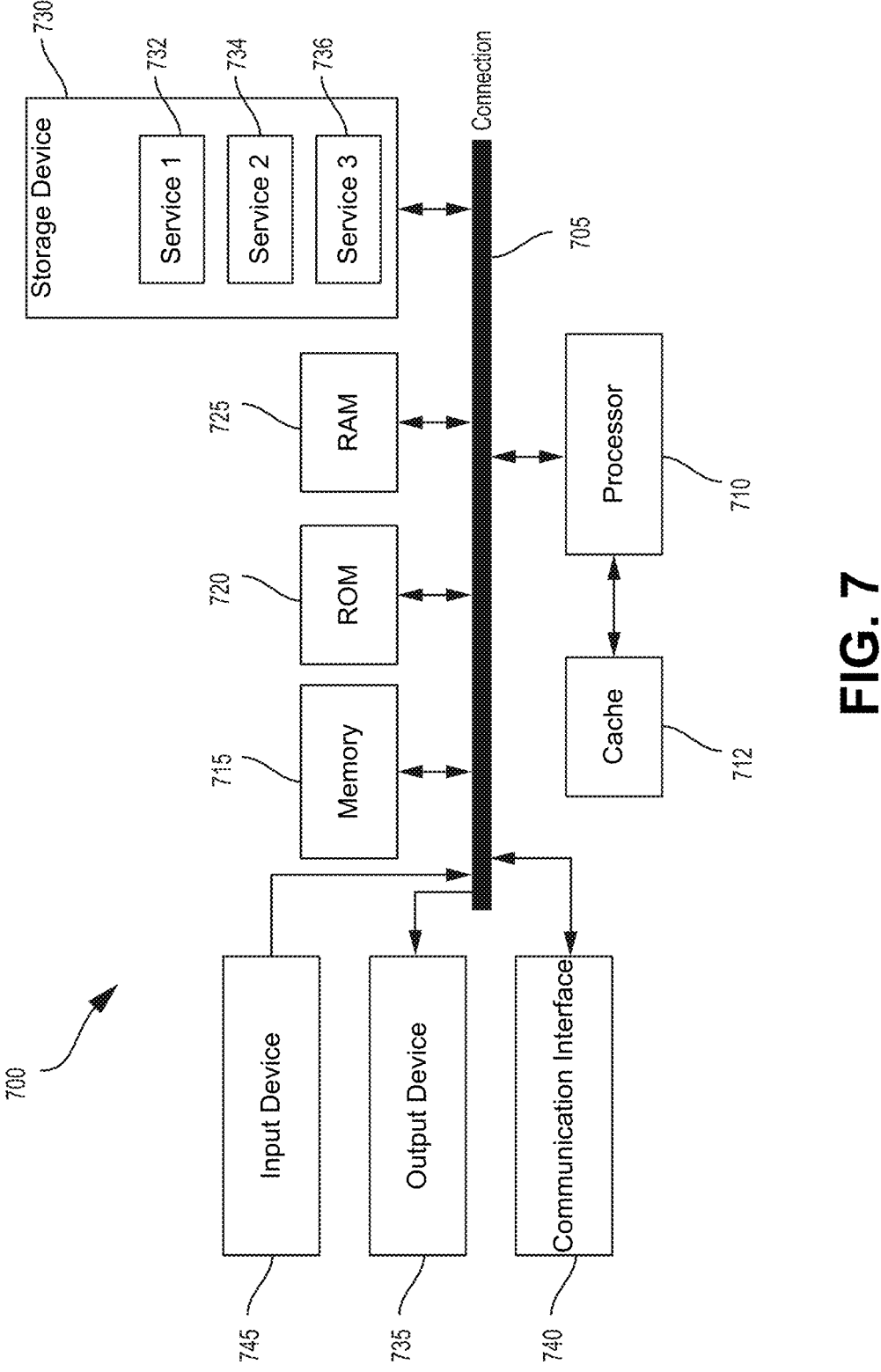
FIG. 7 is a block diagram illustrating an example of a computing system, which may be employed by the disclosed systems and techniques, in accordance with some examples.

FIG. 7 is a block diagram illustrating an example of a computing system 700, which may be employed by the disclosed systems and techniques. In particular, FIG. 7 illustrates an example of computing system 700, which can be, for example, any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some aspects, computing system 700 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 700 includes at least one processing unit (CPU or processor) 710 and connection 705 that communicatively couples various system components including system memory 715, such as read-only memory (ROM) 720 and random-access memory (RAM) 725 to processor 710. Computing system 700 can include a cache 712 of high-speed memory connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700.

Computing system 700 can include communications interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 740 may also include one or more range sensors (e.g., LIDAR sensors, laser range finders, RF radars, ultrasonic sensors, and infrared (IR) sensors) configured to collect data and provide measurements to processor 710, whereby processor 710 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some aspects, a hardware service that performs a particular function can include the software component stored in a computer-readable medium in connection with the necessary hardware components, such as processor 710, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A network entity for wireless communications, the network entity comprising: at least one memory; and at least one processor coupled to the at least one memory and configured to: determine a transmit power value for communicating with a wireless communication device; select a subframe of a plurality of subframes, wherein the subframe is selected based on the transmit power value and a respective subframe transmit power value associated with the subframe, and wherein the respective subframe transmit power value is greater than or equal to the transmit power value; allocate the wireless communication device to the subframe; and transmit a periodic advertisement (PA) to a plurality of wireless communication devices using the subframe and the respective subframe transmit power value, wherein the plurality of wireless communication devices includes the wireless communication device.

Aspect 2. The network entity of Aspect 1, wherein the at least one processor is configured to: allocate each wireless communication device of the plurality of wireless communication devices to the subframe, wherein the respective subframe transmit power value is greater than or equal to a respective transmit power value for communicating with each wireless communication device.

Aspect 3. The network entity of any of Aspects 1 to 2, wherein the at least one processor is further configured to: select the subframe based on identifying one or more available device identifiers (IDs) associated with the subframe; and allocate a particular device ID of the one or more available device IDs to the wireless communication device.

Aspect 4. The network entity of any of Aspects 1 to 3, wherein the transmit power value is a minimum transmit power value for communicating with the wireless communication device.

Aspect 5. The network entity of Aspect 4, wherein, to select the subframe, the at least one processor is configured to: identify one or more candidate subframes of the plurality of subframes, wherein each candidate subframe of the one or more candidate subframes is associated with a respective subframe transmit power value that is greater than or equal to the minimum transmit power value, and wherein each candidate subframe includes one or more available device identifiers (IDs); and select a particular candidate subframe of the one or more candidate subframes based on a difference between the minimum transmit power value and the respective subframe transmit power value associated with the particular candidate subframe.

Aspect 6. The network entity of any of Aspects 4 to 5, wherein the minimum transmit power value corresponds to a minimum Received Signal Strength Indication (RSSI) value of the wireless communication device.

Aspect 7. The network entity of any of Aspects 1 to 6, wherein, to determine the transmit power value, the at least one processor is configured to perform a transmit power handshake associated with the network entity and the wireless communication device.

Aspect 8. The network entity of Aspect 7, wherein, to perform the transmit power handshake, the at least one processor is configured to: transmit, to the wireless communication device, a first signal including information indicative of a transmit power value of the first signal; receive, from the wireless communication device, a second signal including Received Signal Strength Indication (RSSI) information associated with the first signal; and determine a minimum transmit power value based on the transmit power value of the first signal and the RSSI information associated with the first signal.

Aspect 9. The network entity of any of Aspects 1 to 8, wherein the at least one processor is configured to: receive an onboarding request from the wireless communication device; and determine the transmit power value for communicating with the wireless communication device based on receiving the onboarding request.

Aspect 10. The network entity of any of Aspects 1 to 9, wherein at the at least one processor is configured to: determine that the plurality of subframes does not include an available subframe to allocate to the wireless communication device; associate the transmit power value to an un-allocated subframe of the plurality of subframes, wherein a respective subframe transmit power value of the un-allocated subframe is equal to the transmit power value; and allocate the un-allocated subframe to the wireless communication device.

Aspect 11. The network entity of any of Aspects 1 to 10, wherein the at least one processor is further configured to: receive, from a plurality of wireless communication devices, Received Signal Strength Indication (RSSI) information associated with a PA transmitted to the plurality of wireless communication devices; and determine, based on the RSSI information, a minimum transmit power value for communicating with the plurality of wireless communication devices, wherein the minimum transmit power value is based on a lowest RSSI value received from the plurality of wireless communication devices.

Aspect 12. The network entity of Aspect 11, wherein the at least one processor is configured to use the minimum transmit power value to transmit one or more PAs using each subframe of the plurality of subframes.

Aspect 13. The network entity of any of Aspects 1 to 12, wherein the network entity is a Periodic Advertisement with Response (PAwR) central device.

Aspect 14. The network entity of any of Aspects 1 to 13, wherein the wireless communication device is a peripheral device.

Aspect 15. The network entity of any of Aspects 1 to 14, wherein the PA is a Periodic Advertisement with Response (PAwR) transmission.

Aspect 16. The network entity of any of Aspects 1 to 15, wherein the at least one processor is further configured to: determine a second subframe transmit power value for the subframe, wherein the second subframe transmit power value is different from the respective subframe transmit power value; and transmit the PA to the plurality of wireless communication devices using the subframe and the second subframe transmit power value.

Aspect 17. The network entity of Aspect 16, wherein, to determine the second subframe transmit power value, the at least one processor is configured to: receive, from one or more wireless communication devices of the plurality of wireless communication devices associated with the subframe, a second Received Signal Strength Indication (RSSI) value different from a first RSSI value used to determine the respective subframe transmit power value; and determine the second subframe transmit power value based on the second RSSI value received from each wireless communication device of the one or more wireless communication devices.

Aspect 18. The network entity of Aspect 17, wherein the at least one processor is configured to receive each respective second RSSI value using the subframe associated with the plurality of wireless communication devices, and wherein each respective second RSSI value is received after allocating the wireless communication device to the subframe.

Aspect 19. A method of wireless communications performed at a network entity, the method comprising: determining a transmit power value for communicating with a wireless communication device; selecting a subframe of a plurality of subframes, wherein the subframe is selected based on the transmit power value and a respective subframe transmit power value associated with the subframe, and wherein the respective subframe transmit power value is greater than or equal to the transmit power value; allocating the wireless communication device to the subframe; and transmitting a periodic advertisement (PA) to a plurality of wireless communication devices using the subframe and the respective subframe transmit power value, wherein the plurality of wireless communication devices includes the wireless communication device.

Aspect 20. The method of Aspect 19, further comprising: allocating each wireless communication device of the plurality of wireless communication devices to the subframe, wherein the respective subframe transmit power value is greater than or equal to a respective transmit power value for communicating with each wireless communication device.

Aspect 21. The method of any of Aspects 19 to 20, further comprising: selecting the subframe based on identifying one or more available device identifiers (IDs) associated with the subframe; and allocating a particular device ID of the one or more available device IDs to the wireless communication device.

Aspect 22. The method of any of Aspects 19 to 21, wherein the transmit power value is a minimum transmit power value for communicating with the wireless communication device.

Aspect 23. The method of Aspect 22, wherein selecting the subframe comprises: identifying one or more candidate subframes of the plurality of subframes, wherein each candidate subframe of the one or more candidate subframes is associated with a respective subframe transmit power value that is greater than or equal to the minimum transmit power value, and wherein each candidate subframe includes one or more available device identifiers (IDs); and selecting a particular candidate subframe of the one or more candidate subframes based on a difference between the minimum transmit power value and the respective subframe transmit power value associated with the particular candidate subframe.

Aspect 24. The method of any of Aspects 22 to 23, wherein the minimum transmit power value corresponds to a minimum Received Signal Strength Indication (RSSI) value of the wireless communication device.

Aspect 25. The method of any of Aspects 19 to 24, wherein determining the transmit power value comprises performing a transmit power handshake associated with the network entity and the wireless communication device.

Aspect 26. The method of Aspect 25, wherein performing the transmit power handshake comprises: transmitting, to the wireless communication device, a first signal including information indicative of a transmit power value of the first signal; receiving, from the wireless communication device, a second signal including Received Signal Strength Indication (RSSI) information associated with the first signal; and determining a minimum transmit power value based on the transmit power value of the first signal and the RSSI information associated with the first signal.

Aspect 27. The method of any of Aspects 19 to 26, further comprising: receiving an onboarding request from the wireless communication device; and determining the transmit power value for communicating with the wireless communication device based on receiving the onboarding request.

Aspect 28. The method of any of Aspects 19 to 27, further comprising: determining that the plurality of subframes does not include an available subframe to allocate to the wireless communication device; associating the transmit power value to an un-allocated subframe of the plurality of subframes, wherein a respective subframe transmit power value of the un-allocated subframe is equal to the transmit power value; and allocating the un-allocated subframe to the wireless communication device.

Aspect 29. The method of any of Aspects 19 to 28, further comprising: receiving, from a plurality of wireless communication devices, Received Signal Strength Indication (RSSI) information associated with a PA transmitted to the plurality of wireless communication devices; and determining, based on the RSSI information, a minimum transmit power value for communicating with the plurality of wireless communication devices, wherein the minimum transmit power value is based on a lowest RSSI value received from the plurality of wireless communication devices.

Aspect 30. The method of Aspect 29, further comprising using the minimum transmit power value to transmit one or more PAs using each subframe of the plurality of subframes.

Aspect 31. The method of any of Aspects 19 to 30, wherein the network entity is a Periodic Advertisement with Response (PAwR) central device.

Aspect 32. The method of any of Aspects 19 to 31, wherein the wireless communication device is a peripheral device.

Aspect 33. The method of any of Aspects 19 to 32, wherein the PA is a Periodic Advertisement with Response (PAwR) transmission.

Aspect 34. The method of any of Aspects 19 to 33, further comprising: determining a second subframe transmit power value for the subframe, wherein the second subframe transmit power value is different from the respective subframe transmit power value; and transmitting a second PA to the plurality of wireless communication devices using the subframe and the second subframe transmit power value.

Aspect 35. The method of Aspect 34, wherein determining the second subframe transmit power value comprises: receiving, from one or more wireless communication devices of the plurality of wireless communication devices associated with the subframe, a second Received Signal Strength Indication (RSSI) value different from a first RSSI value used to determine the respective subframe transmit power value; and determining the second subframe transmit power value based on the second RSSI value received from each wireless communication device of the one or more wireless communication devices.

Aspect 36. The method of Aspect 35, further comprising receiving each respective second RSSI value using the subframe associated with the plurality of wireless communication devices, and wherein each respective second RSSI value is received after allocating the wireless communication device to the subframe Aspect 37. A non-transitory computer-readable medium including instructions that, when executed by at least one processor, cause the at least one processor to perform operations according to any of Aspects 1 to 18.

Aspect 38. A non-transitory computer-readable medium including instructions that, when executed by at least one processor, cause the at least one processor to perform operations according to any of Aspects 19 to 36.

Aspect 39. An apparatus for wireless communication, the apparatus comprising one or more means for performing operations according to any of Aspects 1 to 18.

Aspect 40. An apparatus for wireless communication, the apparatus comprising one or more means for performing operations according to any of Aspects 19 to 36.

What is claimed is:

1. A network entity for wireless communications, the network entity comprising:

at least one memory; and at least one processor coupled to the at least one memory and configured to:

determine a transmit power value for communicating with a wireless communication device;

compare the transmit power value for communicating with the wireless communication device to a respective subframe transmit power value associated with each subframe of a plurality of subframes;

determine, based on the comparison, a subframe of the plurality of subframes having a subframe transmit power value that is greater than or equal to the transmit power value for communicating with the wireless communication device;

select the subframe for allocation to the wireless communication device based on the subframe having the subframe transmit power value that is greater than or equal to the transmit power value;

allocate the wireless communication device to the subframe; and transmit a periodic advertisement (PA) to a plurality of wireless communication devices using the subframe and the subframe transmit power value, wherein the plurality of wireless communication devices includes the wireless communication device.

2. The network entity of claim 1, wherein the at least one processor is configured to:

allocate each wireless communication device of the plurality of wireless communication devices to the subframe, wherein the subframe transmit power value is greater than or equal to a respective transmit power value for communicating with each wireless communication device.

3. The network entity of claim 1, wherein the at least one processor is further configured to:

select the subframe based on identifying one or more available device identifiers (IDs) associated with the subframe; and allocate a particular device ID of the one or more available device IDs to the wireless communication device.

4. The network entity of claim 1, wherein the transmit power value is a minimum transmit power value for communicating with the wireless communication device.

5. The network entity of claim 4, wherein, to select the subframe, the at least one processor is configured to:

identify one or more candidate subframes of the plurality of subframes, wherein each candidate subframe of the one or more candidate subframes is associated with a respective subframe transmit power value that is greater than or equal to the minimum transmit power value, and wherein each candidate subframe includes one or more available device identifiers (IDs); and select a particular candidate subframe of the one or more candidate subframes based on a difference between the minimum transmit power value and the respective subframe transmit power value associated with the particular candidate subframe.

6. The network entity of claim 4, wherein the minimum transmit power value corresponds to a minimum Received Signal Strength Indication (RSSI) value of the wireless communication device.

7. The network entity of claim 1, wherein, to determine the transmit power value, the at least one processor is configured to perform a transmit power handshake associated with the network entity and the wireless communication device.

8. The network entity of claim 7, wherein, to perform the transmit power handshake, the at least one processor is configured to:

transmit, to the wireless communication device, a first signal including information indicative of a transmit power value of the first signal;

receive, from the wireless communication device, a second signal including Received Signal Strength Indication (RSSI) information associated with the first signal; and determine a minimum transmit power value based on the transmit power value of the first signal and the RSSI information associated with the first signal.

9. The network entity of claim 1, wherein the at least one processor is configured to:

receive an onboarding request from the wireless communication device; and determine the transmit power value for communicating with the wireless communication device based on receiving the onboarding request.

10. The network entity of claim 1, wherein at the at least one processor is configured to:

determine that the plurality of subframes does not include an available subframe to allocate to the wireless communication device;

associate the transmit power value to an un-allocated subframe of the plurality of subframes, wherein a respective subframe transmit power value of the un-allocated subframe is equal to the transmit power value; and allocate the un-allocated subframe to the wireless communication device.

11. The network entity of claim 1, wherein the at least one processor is further configured to:

receive, from a plurality of wireless communication devices, Received Signal Strength Indication (RSSI) information associated with a PA transmitted to the plurality of wireless communication devices; and determine, based on the RSSI information, a minimum transmit power value for communicating with the plurality of wireless communication devices, wherein the minimum transmit power value is based on a lowest RSSI value received from the plurality of wireless communication devices.

12. The network entity of claim 11, wherein the at least one processor is configured to use the minimum transmit power value to transmit one or more PAs using each subframe of the plurality of subframes.

13. The network entity of claim 1, wherein the network entity is a Periodic Advertisement with Response (PAwR) central device.

14. The network entity of claim 1, wherein the wireless communication device is a peripheral device.

15. The network entity of claim 1, wherein the PA is a Periodic Advertisement with Response (PAwR) transmission.

16. The network entity of claim 1, wherein the at least one processor is further configured to:

determine a second subframe transmit power value for the subframe, wherein the second subframe transmit power value is different from the subframe transmit power value; and transmit the PA to the plurality of wireless communication devices using the subframe and the second subframe transmit power value.

17. The network entity of claim 16, wherein, to determine the second subframe transmit power value, the at least one processor is configured to:

receive, from one or more wireless communication devices of the plurality of wireless communication devices associated with the subframe, a second Received Signal Strength Indication (RSSI) value different from a first RSSI value used to determine the subframe transmit power value; and determine the second subframe transmit power value based on the second RSSI value received from each wireless communication device of the one or more wireless communication devices.

18. The network entity of claim 17, wherein the at least one processor is configured to receive each respective second RSSI value using the subframe associated with the plurality of wireless communication devices, and wherein each respective second RSSI value is received after allocating the wireless communication device to the subframe.

19. A method of wireless communications performed at a network entity, the method comprising:

determining a transmit power value for communicating with a wireless communication device;

comparing the transmit power value for communicating with the wireless communication device to a respective subframe transmit power value associated with each subframe of a plurality of subframes;

determining, based on the comparison, a subframe of the plurality of subframes having a subframe transmit power value that is greater than or equal to the transmit power value for communicating with the wireless communication device;

selecting the subframe for allocation to the wireless communication device based on the subframe having the subframe transmit power value that is greater than or equal to the transmit power value;

allocating the wireless communication device to the subframe; and transmitting a periodic advertisement (PA) to a plurality of wireless communication devices using the subframe and the subframe transmit power value, wherein the plurality of wireless communication devices includes the wireless communication device.

20. The method of claim 19, further comprising:

allocating each wireless communication device of the plurality of wireless communication devices to the subframe, wherein the subframe transmit power value is greater than or equal to a respective transmit power value for communicating with each wireless communication device.

21. The method of claim 19, further comprising:

selecting the subframe based on identifying one or more available device identifiers (IDs) associated with the subframe; and allocating a particular device ID of the one or more available device IDs to the wireless communication device.

22. The method of claim 19, wherein the transmit power value is a minimum transmit power value for communicating with the wireless communication device.

23. The method of claim 22, wherein selecting the subframe comprises:

identifying one or more candidate subframes of the plurality of subframes, wherein each candidate subframe of the one or more candidate subframes is associated with a respective subframe transmit power value that is greater than or equal to the minimum transmit power value, and wherein each candidate subframe includes one or more available device identifiers (IDs); and selecting a particular candidate subframe of the one or more candidate subframes based on a difference between the minimum transmit power value and the respective subframe transmit power value associated with the particular candidate subframe.

24. The method of claim 22, wherein the minimum transmit power value corresponds to a minimum Received Signal Strength Indication (RSSI) value of the wireless communication device.

25. The method of claim 19, wherein determining the transmit power value comprises performing a transmit power handshake associated with the network entity and the wireless communication device.

26. The method of claim 25, wherein performing the transmit power handshake comprises:

transmitting, to the wireless communication device, a first signal including information indicative of a transmit power value of the first signal;

receiving, from the wireless communication device, a second signal including Received Signal Strength Indication (RSSI) information associated with the first signal; and determining a minimum transmit power value based on the transmit power value of the first signal and the RSSI information associated with the first signal.

27. The method of claim 19, further comprising:

receiving an onboarding request from the wireless communication device; and determining the transmit power value for communicating with the wireless communication device based on receiving the onboarding request.

28. The method of claim 19, further comprising:

determining that the plurality of subframes does not include an available subframe to allocate to the wireless communication device;

associating the transmit power value to an un-allocated subframe of the plurality of subframes, wherein a respective subframe transmit power value of the un-allocated subframe is equal to the transmit power value; and allocating the un-allocated subframe to the wireless communication device.

29. The method of claim 19, further comprising:

receiving, from a plurality of wireless communication devices, Received Signal Strength Indication (RSSI) information associated with a PA transmitted to the plurality of wireless communication devices; and determining, based on the RSSI information, a minimum transmit power value for communicating with the plurality of wireless communication devices, wherein the minimum transmit power value is based on a lowest RSSI value received from the plurality of wireless communication devices.

30. The method of claim 29, further comprising using the minimum transmit power value to transmit one or more PAs using each subframe of the plurality of subframes.

* * * * *